(12) United States Patent
Udhayanan et al.

(10) Patent No.: US 12,738,041 B2
(45) Date of Patent: Sep. 15, 2026

(54) TEXT-CONDITIONED VISUAL ATTENTION FOR MULTIMODAL MACHINE LEARNING MODELS

(71) Applicant: Adobe Inc., San Jose, CA (US)

(72) Inventors: Prateksha Udhayanan, Bangalore (IN); Srikrishna Karanam, Bangalore (IN); Balaji Vasan Srinivasa, Bangalore (IN)

(73) Assignee: Adobe Inc., San Jose, CA (US)

( * ) Notice: Subject to any disclaimer, the term of this patent is extended or adjusted under 35 U.S.C. 154(b) by 560 days.

(21) Appl. No.: 18/351,211

(22) Filed: Jul. 12, 2023

(65) Prior Publication Data

US 2025/0022263 A1 Jan. 16, 2025

(51) Int. Cl.
*G06V 10/80* (2022.01)
*G06T 11/60* (2006.01)
*G06V 10/82* (2022.01)

(52) U.S. Cl.
CPC ............ *G06V 10/811* (2022.01); *G06T 11/60* (2013.01); *G06V 10/82* (2022.01)

(58) Field of Classification Search
CPC ........ G06V 10/811; G06V 10/82; G06T 11/60
USPC .......................................................... 382/156
See application file for complete search history.

(56) References Cited

U.S. PATENT DOCUMENTS

2019/0108448 A1* 4/2019 O'Malia ................ G06N 3/084
2020/0226421 A1* 7/2020 Almazan ................ G06V 20/52
2020/0356591 A1* 11/2020 Yada ..................... G06F 16/583
2020/0380358 A1* 12/2020 Kemertas ................. G06N 3/09
2023/0073843 A1* 3/2023 Sampaio De Rezende ................ G06F 16/56

OTHER PUBLICATIONS

Aditya Chattopadhay, Anirban Sarkar, Prantik Howlader, and Vineeth N Balasubramanian. Grad-cam++: Generalized gradient-based visual explanations for deep convolutional networks. In 2018 IEEE winter conference on applications of computer vision (WACV), pp. 839-847. IEEE, 2018.

(Continued)

*Primary Examiner* — Neil R McLean
(74) *Attorney, Agent, or Firm* — Keller Preece PLLC

(57) ABSTRACT

The present disclosure relates to systems, non-transitory computer-readable media, and methods for conditioning images on modification texts to generate multi-modal gradient attention maps. In particular, in some embodiments, the disclosed systems generate, utilizing a vision-language neural network of an image-text comparison machine learning model, a reference text-image feature vector based on a reference image and a modification text. Additionally, in some embodiments, the disclosed systems generate, utilizing the vision-language neural network of the image-text comparison machine learning model, a target text-image feature vector based on a target image and the modification text. Moreover, in some implementations, the disclosed systems generate, from the reference text-image feature vector and the target text-image feature vector, a multi-modal gradient attention map reflecting a visual grounding of the image-text comparison machine learning model relative to the modification text.

20 Claims, 13 Drawing Sheets

(56) References Cited

OTHER PUBLICATIONS

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning transferable visual models from natural language supervision. In International Conference on Machine Learning, pp. 8748-8763. PMLR, 2021.
Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, et al. An image is worth 16×16 words: Transformers for image recognition at scale. arXiv preprint arXiv:2010.11929, 2020.
Andrew Zhai, Dmitry Kislyuk, Yushi Jing, Michael Feng, Eric Tzeng, Jeff Donahue, Yue Li Du, and Trevor Darrell. Visual discovery at pinterest. In Proceedings of the 26th International Conference on World Wide Web Companion, pp. 515-524, 2017.
Ayan Kumar Bhunia, Subhadeep Koley, Abdullah Faiz Ur Rahman Khilji, Aneeshan Sain, Pinaki Nath Chowdhury, Tao Xiang, and Yi-Zhe Song. Sketching without worrying: Noise-tolerant sketch-based image retrieval. In Proceedings of the IEEE/CVF Conference on Computer Vision and Pattern Recognition, pp. 999-1008, 2022.
Bolei Zhou, Aditya Khosla, Agata Lapedriza, Aude Oliva, and Antonio Torralba. Learning deep features for discriminative localization. In Proceedings of the IEEE conference on computer vision and pat tern recognition, pp. 2921-2929, 2016.
Eric Dodds, Jack Culpepper, SimaoHerdade, Yang Zhang, and Kofi Boakye. Modality- agnostic attention fusion for visual search with text feedback. arXiv preprint arXiv:2007.00145, 2020.
Fan Yang, Ajinkya Kale, Yury Bubnov, Leon Stein, Qiaosong Wang, Hadi Kiapour, and Robinson Piramuthu. Visual search at ebay. In Proceedings of the 23rd ACM SIGKDD international conference on knowledge discovery and data mining, pp. 2101-2110, 2017.
Forrester Research, "Improve Creative Speed, Quality, and Relevancy with Automation", Forrester Opportunity Snapshot: A Custom Study Commissioned by Celtra, Feb. 2020.
Hui Wu, Yupeng Gao, Xiaoxiao Guo, Ziad Al-Halah, Steven Rennie, Kristen Grauman, and Rogerio Feris. Fashion iq: A new dataset towards retrieving images by natural language feedback. In Proceedings of the IEEE/CVF Conference on Computer Vision and Pattern Recognition, pp. 11307-11317, 2021.
Iacopo Masi, Yue Wu, Tal Hassner, and Prem Natarajan. Deep face recognition: A survey. In 2018 31st SIBGRAPI conference on graphics, patterns and images (SIBGRAPI), pp. 471-478. IEEE, 2018.
Ilya Loshchilov and Frank Hutter. Decoupled weight decay regularization. arXiv preprint arXiv:1711.05101, 2017.
Jin-Hwa Kim, Sang-Woo Lee, Donghyun Kwak, Min-Oh Heo, Jeonghee Kim, Jung-Woo Ha, and Byoung-Tak Zhang. Multimodal residual learning for visual qa. Advances in neu- ral information processing systems, 29, 2016.
Lei Chen, Jianhui Chen, Hossein Hajimirsadeghi, and Greg Mori. Adapting grad-cam for embedding networks. In Proceedings of the IEEE/CVF Winter Conference on Applications of Computer Vision, pp. 2794-2803, 2020.
Liang Zheng, Yi Yang, and Qi Tian. Sift meets cnn: A decade survey of instance retrieval. IEEE transactions on pattern analysis and machine intelligence, 40(5):1224-1244, 2017.
Liunian Harold Li, Mark Yatskar, Da Yin, Cho-Jui Hsieh, and Kai-Wei Chang. Visualbert: A simple and performant baseline for vision and language. arXiv preprint arXiv:1908.03557, 2019.
Meng Zheng, Srikrishna Karanam, Terrence Chen, Richard J. Radke, and Ziyan Wu. Visual similarity attention. In Proceedings of the Thirty-First International Joint Conference on Artificial Intelligence, IJCAI-22, pp. 1728-1735. International Joint Conferences on Artificial Intelligence Organization, 7 2022.
Muhammad Umer Anwaar, Egor Labintcev, Martin Kleinsteuber. Compositional learning of image-text query for image retrieval. In Proceedings of the IEEE/CVF Winter Conference on Applications of Computer Vision, pp. 1140-1149, 2021.
Nam Vo, Lu Jiang, Chen Sun, Kevin Murphy, Li-Jia Li, Li Fei-Fei, and James Hays. Composing text and image for image retrieval-an empirical odyssey. In Proceedings of the IEEE/CVF conference on computer vision and pattern recognition, pp. 6439-6448, 2019.
Peng-Tao Jiang, Chang-Bin Zhang, Qibin Hou, Ming-Ming Cheng, and Yunchao Wei. Layercam: Exploring hierarchical class activation maps for localization. IEEE Transactions on Image Processing, 30:5875-5888, 2021.
Pengchuan Zhang, Xiujun Li, Xiaowei Hu, Jianwei Yang, Lei Zhang, Lijuan Wang, Yejin Choi, and Jianfeng Gao. Vinvl: Revisiting visual representations in vision-language models. In Proceedings of the IEEE/CVF Conference on Computer Vision and Pattern Recognition, pp. 5579-5588, 2021.
Ramprasaath R Selvaraju, Michael Cogswell, Abhishek Das, Ramakrishna Vedantam, Devi Parikh, and Dhruv Batra. Grad-cam: Visual explanations from deep networks via gradient-based localization. In Proceedings of the IEEE international conference on computer vision, pp. 618-626, 2017.
Ritendra Datta, Dhiraj Joshi, Jia Li, and James Z Wang. Image retrieval: Ideas, influences, and trends of the new age. ACM Computing Surveys (Csur), 40(2):1-60, 2008.
Sonam Goenka, Zhaoheng Zheng, Ayush Jaiswal, Rakesh Chada, Yue Wu, Varsha Hedau, and Pradeep Natarajan. Fashionvlp: Vision language transformer for fashion retrieval with feedback. In Proceedings of the IEEE/CVF Conference on Computer Vision and Pattern Recognition, pp. 14105-14115, 2022.
Stuart Rose, Dave Engel, Nick Cramer, and Wendy Cowley. Automatic keyword extraction from individual documents. Text mining: applications and theory, pp. 1-20, 2010.
Timo L'uddecke and Alexander Ecker. Image segmentation using text and image prompts. In Proceedings of the IEEE/CVF Conference on Computer Vision and Pattern Recognition (CVPR), pp. 7086-7096, Jun. 2022.
Wenqian Liu, Runze Li, Meng Zheng, Srikrishna Karanam, Ziyan Wu, Bir Bhanu, Richard J Radke, and Octavia Camps. Towards visually explaining variational autoencoders. In Proceedings of the IEEE/CVF Conference on Computer Vision and Pattern Recognition, pp. 8642-8651, 2020.
Yanhao Zhang, Pan Pan, Yun Zheng, Kang Zhao, Yingya Zhang, Xiaofeng Ren, and Rong Jin. Visual search at alibaba. In Proceedings of the 24th ACM SIGKDD International Conference on Knowledge Discovery & Data Mining, pp. 993-1001, 2018.
Yiyang Chen, Zhedong Zheng, Wei Ji, Leigang Qu, and Tat-Seng Chua. Composed image retrieval with text feedback via multi-grained uncertainty regularization. arXiv preprint arXiv:2211.07394, 2022.
Yong Rui, Thomas S Huang, Shih-Fu Chang, et al. Image retrieval: Past, present, and future. Journal of Visual Communication and Image Representation, 10(1):1-23, 1999.
Zheyuan Liu, Cristian Rodriguez-Opazo, Damien Teney, and Stephen Gould. Image retrieval on real-life images with pre-trained vision-and-language models. In Proceedings of the IEEE/CVF International Conference on Computer Vision, pp. 2125-2134, 2021.
Ziwei Liu, Ping Luo, Shi Qiu, Xiaogang Wang, and Xiaoou Tang. Deepfashion: Powering robust clothes recognition and retrieval with rich annotations. In Proceedings of the IEEE conference on computer vision and pattern recognition, pp. 1096-1104, 2016.

* cited by examiner 502
504
"has six white chairs"
512a
512n
Reference Image
Target Image
506
516a
516n 522
524
"have the dog wear a sweater"
532a
532n
Reference Image
Target Image
526
536a
536n

TEXT-CONDITIONED VISUAL ATTENTION FOR MULTIMODAL MACHINE LEARNING MODELS

BACKGROUND

Recent years have seen significant developments in hardware and software platforms for retrieving digital images based on various inputs. For example, some conventional image retrieval systems retrieve digital images from a repository of digital images based on one or more input digital images. To illustrate, conventional image retrieval systems identify a digital image that is similar to an input digital image (e.g., product search, facial recognition). Despite these developments, conventional systems suffer from a number of technical deficiencies, including inaccuracy and inflexibility of implementing computing devices.

BRIEF SUMMARY

Embodiments of the present disclosure provide benefits and/or solve one or more problems in the art with systems, non-transitory computer-readable media, and methods for utilizing multi-modal gradient attention to enhance the visual grounding of machine learning models for images conditioned on modification text. In particular, in some implementations, the disclosed systems utilize multi-modal gradient attention to perform composed image retrieval, which takes an input query consisting of an image and a modification text indicating a desired change to be made on the image, and retrieves one or more images that match the desired change. For instance, in some embodiments, the disclosed systems learn local features to localize an intent of the modification text for the image and retrieve images that better match the intent. In some cases, the disclosed systems utilize a learning objective that focuses the model on the local regions of interest being modified in the retrieval step.

To illustrate, in some implementations, the disclosed systems generate a multi-modal gradient attention map that is conditioned on the modification text. Additionally, the disclosed systems incorporate the multi-modal gradient attention map into a retrieval model training strategy with a novel learning objective that directs a model attention to the correct local regions corresponding to the modification text. In some cases, by training the retrieval model with this novel learning objective, the disclosed systems improve the visual grounding of the model.

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
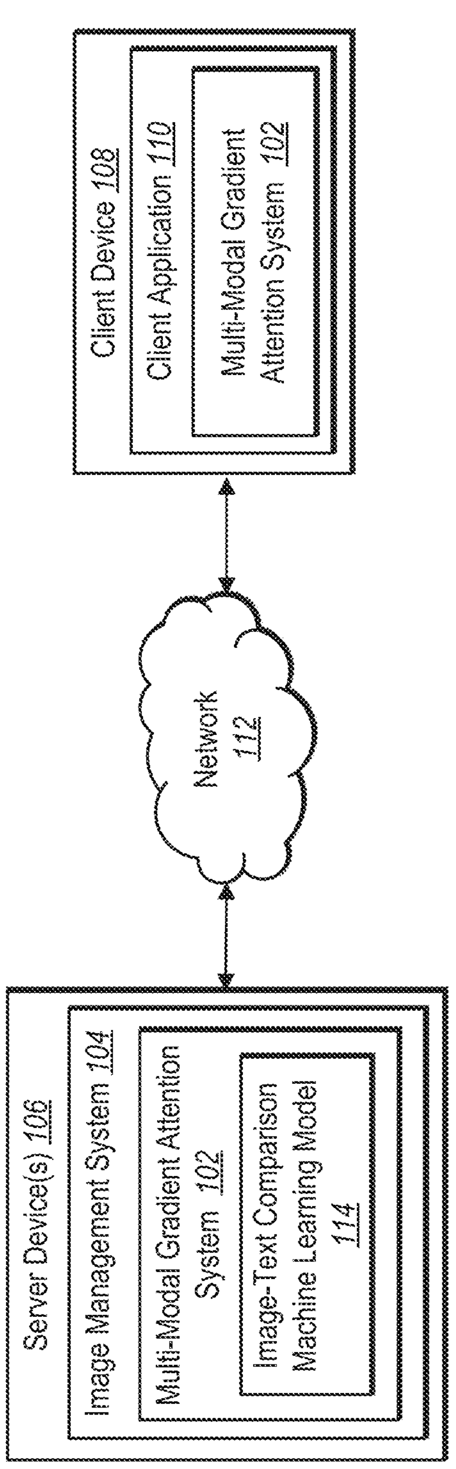
FIG. 1 illustrates a diagram of an environment in which a multi-modal gradient attention system operates in accordance with one or more embodiments.

This disclosure describes one or more embodiments of a multi-modal gradient attention system that generates multi-modal gradient attention maps for digital images conditioned on modification text to illustrate a visual grounding of machine learning models. In particular, in some implementations, the multi-modal gradient attention system utilizes multi-modal gradient attention to perform composed image retrieval. For instance, in some embodiments, the multi-modal gradient attention system combines text features for the modification text with image features for the digital image to learn to localize an intent of the modification text for the image and retrieve images that match the intent. In some embodiments, the multi-modal gradient attention system utilizes a novel learning objective that focuses the machine learning model on local regions of interest to improve the accuracy of retrieved images.

To illustrate, in some implementations, the multi-modal gradient attention system generates a multi-modal gradient attention map that is conditioned on the modification text. For example, the multi-modal gradient attention system generates joint feature vectors (e.g., feature vectors that comprise latent feature information for both the image and the modification text) for a reference image and a target image. The multi-modal gradient attention system compares the joint feature vector for the reference image and the joint feature vector for the target image to generate the multi-modal gradient attention map. To illustrate, the multi-modal gradient attention system generates a gradient vector based on the joint feature vector for the reference image and the joint feature vector for the target image and combines the gradient vector with the joint feature vector for the target image to generate a multi-modal gradient attention map for the target image.

Additionally, in some implementations, the multi-modal gradient attention system incorporates the multi-modal gradient attention map into a learning objective to train a retrieval model. For instance, the multi-modal gradient attention system learns parameters of a machine learning model to direct attention of the machine learning model to local regions corresponding to the modification text. In some cases, by training the machine learning model with this learning objective, the multi-modal gradient attention system improves the visual grounding of the machine learning model relative to the modification text.

Although conventional systems can retrieve images based on other images, such systems have a number of problems in relation to accuracy and flexibility of operation. For instance, conventional systems inaccurately identify salient regions of an image with respect to an intended change to the image. Specifically, conventional systems focus on global features of an image when assessing changes to be made, resulting in incorrect localization of the regions of interest to be modified. Thus, conventional systems have poor visual grounding on salient regions of an image. Due at least in part to this poor visual grounding on salient regions, conventional systems suffer from inaccuracy with selection and retrieval of substitute images.

Additionally, conventional systems are operationally inflexible. Indeed, conventional systems often cannot provide insight into the inner workings of black box machine learning approaches. Thus, during training or implementation, conventional systems often require computationally extensive testing to determine output/performance metrics but fail to provide any indication of the inner functionality or processes within the black box machine learning architecture. Thus, conventional systems do not provide operational insight and flexibility into the internal mechanisms of machine learning architectures.

The multi-modal gradient attention system provides a variety of technical advantages relative to conventional systems. For example, in some embodiments, by utilizing joint text-image features to generate attention maps, the multi-modal gradient attention system improves accuracy relative to conventional systems. Specifically, in some embodiments, the multi-modal gradient attention system generates multi-modal gradient attention maps that are conditioned on modification texts, thereby enhancing the localized attention of retrieval models and increasing the accuracy (e.g., correctness) of retrieved images (e.g., that match the intent of the modification text for a source image).

Moreover, in some embodiments, the multi-modal gradient attention system improves operational flexibility by providing improved insight into black box machine learning models. For example, in one or more embodiments, the multi-modal gradient attention system provides improved illustration of how the internal operations of retrieval models analyze or focus on an image. For instance, without requiring extensive testing to determine performance parameters, the multi-modal gradient attention system measures and illustrates the internal attentiveness of a black box machine learning model relative to different regions of input digital images. Thus, the multi-modal gradient attention system provides valuable insight into the internal mechanisms of machine learning model operation.

Additional detail will now be provided in relation to illustrative figures portraying example embodiments and implementations of a multi-modal gradient attention system. For example, FIG. 1 illustrates a system 100 (or environment) in which a multi-modal gradient attention system 102 operates in accordance with one or more embodiments. As illustrated, the system 100 includes server device(s) 106, a network 112, and a client device 108. As further illustrated, the server device(s) 106 and the client device 108 communicate with one another via the network 112.

As shown in FIG. 1, the server device(s) 106 includes an image management system 104 that further includes the multi-modal gradient attention system 102. In some embodiments, the multi-modal gradient attention system 102 generates multi-modal gradient attention maps that reflect a visual grounding of a machine learning model relative to a modification text indicating a change to a digital image. In some embodiments, the multi-modal gradient attention system 102 trains the machine learning model (such as an image-text comparison machine learning model 114) to enhance the visual grounding of the machine learning model. In some embodiments, the server device(s) 106 includes, but is not limited to, a computing device (such as explained below with reference to FIG. 11).

In some instances, the multi-modal gradient attention system 102 receives a request (e.g., from the client device 108) to evaluate and/or train a machine learning model. For example, the multi-modal gradient attention system 102 generates one or more multi-modal gradient attention maps based on outputs of the machine learning model. Some embodiments of server device(s) 106 perform a variety of functions via the image management system 104 on the server device(s) 106. To illustrate, the server device(s) 106 (through the multi-modal gradient attention system 102 on the image management system 104) performs functions such as, but not limited to, obtaining a reference digital image and a target digital image, obtaining a modification text, generating feature vectors for the reference digital image and the target digital image based on the modification text, generating a multi-modal gradient attention map, determining a multi-modal gradient attention loss, and/or modifying parameters of the image-text comparison machine learning model 114. In some embodiments, the server device(s) 106 utilizes the image-text comparison machine learning model 114 to generate the feature vectors. In some embodiments, the server device(s) 106 trains the image-text comparison machine learning model 114 as described herein.

Furthermore, as shown in FIG. 1, the system 100 includes the client device 108. In some embodiments, the client device 108 includes, but is not limited to, a mobile device (e.g., a smartphone, a tablet), a laptop computer, a desktop computer, or any other type of computing device, including those explained below with reference to FIG. 11. Some embodiments of client device 108 perform a variety of functions via a client application 110 on client device 108. For example, the client device 108 (through the client application 110) performs functions such as, but not limited to, obtaining a reference digital image and a target digital image, obtaining a modification text, generating feature vectors for the reference digital image and the target digital image based on the modification text, generating a multi-modal gradient attention map, determining a multi-modal gradient attention loss, and/or modifying parameters of the image-text comparison machine learning model 114. In some embodiments, the client device 108 utilizes the image-text comparison machine learning model 114 to generate the feature vectors. In some embodiments, the client device 108 trains the image-text comparison machine learning model 114 as described herein.

To access the functionalities of the multi-modal gradient attention system 102 (as described above and in greater detail below), in one or more embodiments, a user interacts with the client application 110 on the client device 108. For example, the client application 110 includes one or more software applications (e.g., to interact with digital images in accordance with one or more embodiments described herein) installed on the client device 108, such as an image management application, an image editing application, and/or an image retrieval application. In certain instances, the client application 110 is hosted on the server device(s) 106. Additionally, when hosted on the server device(s) 106, the client application 110 is accessed by the client device 108 through a web browser and/or another online interfacing platform and/or tool.

As illustrated in FIG. 1, in some embodiments, the multi-modal gradient attention system 102 is hosted by the client application 110 on the client device 108 (e.g., additionally or alternatively to being hosted by the image management system 104 on the server device(s) 106). For example, the multi-modal gradient attention system 102 performs the multi-modal gradient attention techniques described herein on the client device 108. In some implementations, the multi-modal gradient attention system 102 utilizes the server device(s) 106 to train and implement machine learning models (such as the image-text comparison machine learning model 114). In one or more embodiments, the multi-modal gradient attention system 102 utilizes the server device(s) 106 to train machine learning models (such as the image-text comparison machine learning model 114) and utilizes the client device 108 to implement or apply the machine learning models.

Further, although FIG. 1 illustrates the multi-modal gradient attention system 102 being implemented by a particular component and/or device within the system 100 (e.g., the server device(s) 106 and/or the client device 108), in some embodiments the multi-modal gradient attention system 102 is implemented, in whole or in part, by other computing devices and/or components in the system 100. For instance, in some embodiments, the multi-modal gradient attention system 102 is implemented on another client device. More specifically, in one or more embodiments, the description of (and acts performed by) the multi-modal gradient attention system 102 are implemented by (or performed by) the client application 110 on another client device.

In some embodiments, the client application 110 includes a web hosting application that allows the client device 108 to interact with content and services hosted on the server device(s) 106. To illustrate, in one or more implementations, the client device 108 accesses a web page or computing application supported by the server device(s) 106. The client device 108 provides input to the server device(s) 106 (e.g., text strings, files of digital images). In response, the multi-modal gradient attention system 102 on the server device(s) 106 performs operations described herein to generate feature vectors and multi-modal gradient attention maps. The server device(s) 106 provides the output or results of the operations (e.g., one or more multi-modal gradient attention maps) to the client device 108. As another example, in some implementations, the multi-modal gradient attention system 102 on the client device 108 performs operations described herein to generate feature vectors and multi-modal gradient attention maps. The client device 108 provides the output or results of the operations (e.g., one or more multi-modal gradient attention maps) via a display of the client device 108, and/or transmits the output or results of the operations to another device (e.g., the server device(s) 106 and/or another client device).

Additionally, as shown in FIG. 1, the system 100 includes the network 112. As mentioned above, in some instances, the network 112 enables communication between components of the system 100. In certain embodiments, the network 112 includes a suitable network and may communicate using any communication platforms and technologies suitable for transporting data and/or communication signals, examples of which are described with reference to FIG. 11. Furthermore, although FIG. 1 illustrates the server device(s) 106 and the client device 108 communicating via the network 112, in certain embodiments, the various components of the system 100 communicate and/or interact via other methods (e.g., the server device(s) 106 and the client device 108 communicate directly).

As discussed above, in some embodiments, the multi-modal gradient attention system 102 generates one or more multi-modal gradient attention maps reflecting a visual grounding of a machine learning model relative to a modification text. For instance, FIG. 2 illustrates the multi-modal gradient attention system 102 generating multi-modal gradient attention maps for a reference image and a target image, utilizing a modification text, in accordance with one or more embodiments.

Figure 2:
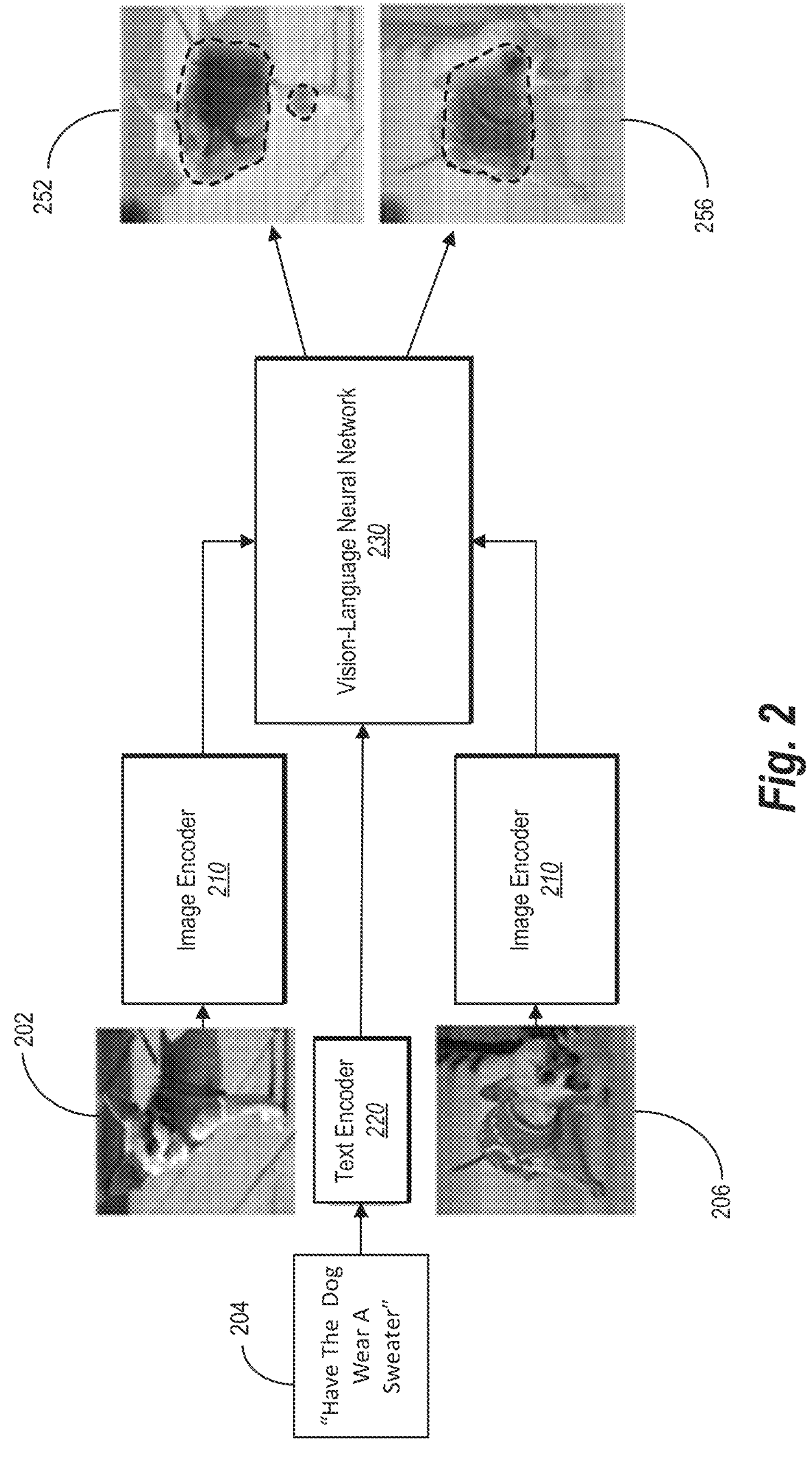
FIG. 2 illustrates the multi-modal gradient attention system generating multi-modal gradient attention maps for a reference image and a target image, utilizing a modification text, in accordance with one or more embodiments.

Specifically, FIG. 2 shows the multi-modal gradient attention system 102 obtaining a reference image 202, a modification text 204, and a target image 206. For example, the reference image 202 is a photograph of a dog, the modification text 204 reads "have the dog wear a sweater," and the target image 206 is a photograph of a dog wearing a sweater. For instance, the target image 206 is close to a semantic intent of the modification text 204 for the reference image 202.

As further shown in FIG. 2, the multi-modal gradient attention system 102 processes the reference image 202 through an image encoder 210 to generate a feature vector for the reference image 202. Similarly, the multi-modal gradient attention system 102 processes the target image 206 through the image encoder 210 to generate a feature vector for the target image 206. In addition, the multi-modal gradient attention system 102 processes the modification text 204 through a text encoder 220 to generate a text feature token.

As mentioned, in some implementations, the multi-modal gradient attention system 102 utilizes a vision-language neural network to generate joint feature vectors. For example, the multi-modal gradient attention system 102 processes the outputs of the image encoder 210 and the text encoder 220 (e.g., the feature vector for the reference image 202 and the text feature token for the modification text 204) through a vision-language neural network 230 to generate a reference text-image feature vector. Similarly, the multi-modal gradient attention system 102 processes the feature vector for the target image 206 and the text feature token for the modification text 204 through the vision-language neural network 230 to generate a target text-image feature vector.

Moreover, in some embodiments, the multi-modal gradient attention system 102 utilizes the reference text-image feature vector and the target text-image feature vector to generate one or more multi-modal gradient attention maps. For instance, the multi-modal gradient attention system 102 generates a multi-modal gradient attention map 252 for the reference image 202. Also, the multi-modal gradient attention system 102 generates a multi-modal gradient attention map 256 for the target image 206. To illustrate, the multimodal gradient attention system 102 generates the multi-modal gradient attention maps 252, 256 by comparing the reference text-image feature vector and the target text-image feature vector.

In some embodiments, the multi-modal gradient attention system 102 utilizes a Siamese model to process the reference image 202, the modification text 204, and the target image 206. For example, the multi-modal gradient attention system 102 uses the same image encoder 210 (e.g., with the same parameters) to process both the reference image 202 and the target image 206. Additionally, the multi-modal gradient attention system 102 utilizes the same vision-language neural network 230 to process the outputs of the image encoder 210. As explained further below, in some implementations, the multi-modal gradient attention system 102 compares the respective outputs from the image encoder 210 and the vision-language neural network 230 to generate the multi-modal gradient attention maps 252, 256 and to train a machine learning model. In some implementations, the multi-modal gradient attention system 102 shares weights (e.g., utilizes common parameters) across both the reference and target branches (depicted in FIG. 2) to implement the image-text comparison machine learning model 114 as a Siamese model.

A machine learning model includes a computer representation that is tunable (e.g., trained) based on inputs to approximate unknown functions used for generating corresponding outputs. In particular, a machine learning model can include a computer-implemented model that utilizes algorithms to learn from, and make predictions on, known data by analyzing the known data to learn to generate outputs that reflect patterns and attributes of the known data. For instance, in some cases, a machine learning model includes, but is not limited to, a neural network (e.g., a convolutional neural network, recurrent neural network, or other deep learning network), a decision tree (e.g., a gradient boosted decision tree), support vector learning, Bayesian networks, a diffusion model, or a combination thereof. In some embodiments, a machine learning model includes an image-text comparison machine learning model trained to condition images on modification texts. In some embodiments, a machine learning model includes an image encoder, a text encoder, and/or a vision-language model.

Similarly, a neural network includes a machine learning model that is trainable and/or tunable based on inputs to determine classifications and/or scores, or to approximate unknown functions. For example, in some cases, a neural network includes a model of interconnected artificial neurons (e.g., organized in layers) that communicate and learn to approximate complex functions and generate outputs based on inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a diffusion neural network, a recurrent neural network (e.g., an LSTM), a graph neural network, or a generative adversarial neural network. In some embodiments, a neural network includes an image encoder, a text encoder, and/or a vision-language neural network.

In some cases, an image encoder includes a component of a vision-language model that encodes or converts an image to a latent feature representation (e.g., a feature vector) for the image. For instance, an image encoder converts image data in a two-dimensional, three-channel image matrix to a d-dimensional vector numerical representation. In some embodiments, an image encoder includes a vision transformer.

A feature vector includes a numerical representation of features of an image (e.g., features and/or pixels of a digital image), a text string (e.g., features and/or semantic context of a modification text), or a combination of an image and a text string. For example, a feature vector includes a latent feature representation of a digital image generated by one or more layers of a neural network, such as an image encoder of the image-text comparison machine learning model 114. Furthermore, in some cases, a feature vector includes a joint feature vector, such as a text-image feature vector. To illustrate, a text-image feature vector includes latent features of a digital image in combination with a semantic meaning of a modification text. For instance, a feature vector includes a latent feature representation of a combination of a digital image and a modification text, generated by one or more layers of a neural network, such as a vision-language model of the image-text comparison machine learning model 114.

In some cases, a text encoder includes a component of a vision-language model that converts a text string to a latent feature representation (e.g., a feature vector or a feature token) for the text string. For instance, a text encoder converts text sequences to a d-dimensional vector numerical representation.

A text feature token includes a numerical representation of features of a text string (e.g., features suggesting a semantic connotation or meaning). To illustrate, a text feature token includes a latent feature representation of a modification text generated by one or more layers of a neural network, such as a text encoder of the image-text comparison machine learning model 114.

In certain embodiments, a vision-language model includes a machine-learning model (e.g., a deep neural network) designed to associate images with text sequences. For example, a vision-language model converts both a digital image and a text sequence into latent feature vector representations that are comparable with each other (e.g., within a common latent space). In some embodiments, a vision-language model includes a vision-language neural network. In some implementations, a vision-language model includes a vision-language transformer.

A multi-modal gradient attention map includes a map depicting regions in an image of focus (e.g., attention) by a machine learning model. In particular, a multi-modal gradient attention map includes an attention map generated based on differences in feature space between two (or more) images conditioned on a modification text (e.g., a text string with a semantic meaning that indicates one or more regions of an image).

As mentioned, in some embodiments, the multi-modal gradient attention system 102 generates joint feature vectors and multi-modal gradient attention maps to train a machine learning model to determine a target image associated with a reference image conditioned on a modification text. For instance, FIG. 3A illustrates the multi-modal gradient attention system 102 generating feature vectors and a measure of loss based on a reference image, a modification text, and a target image in accordance with one or more embodiments.

Figure 3A:
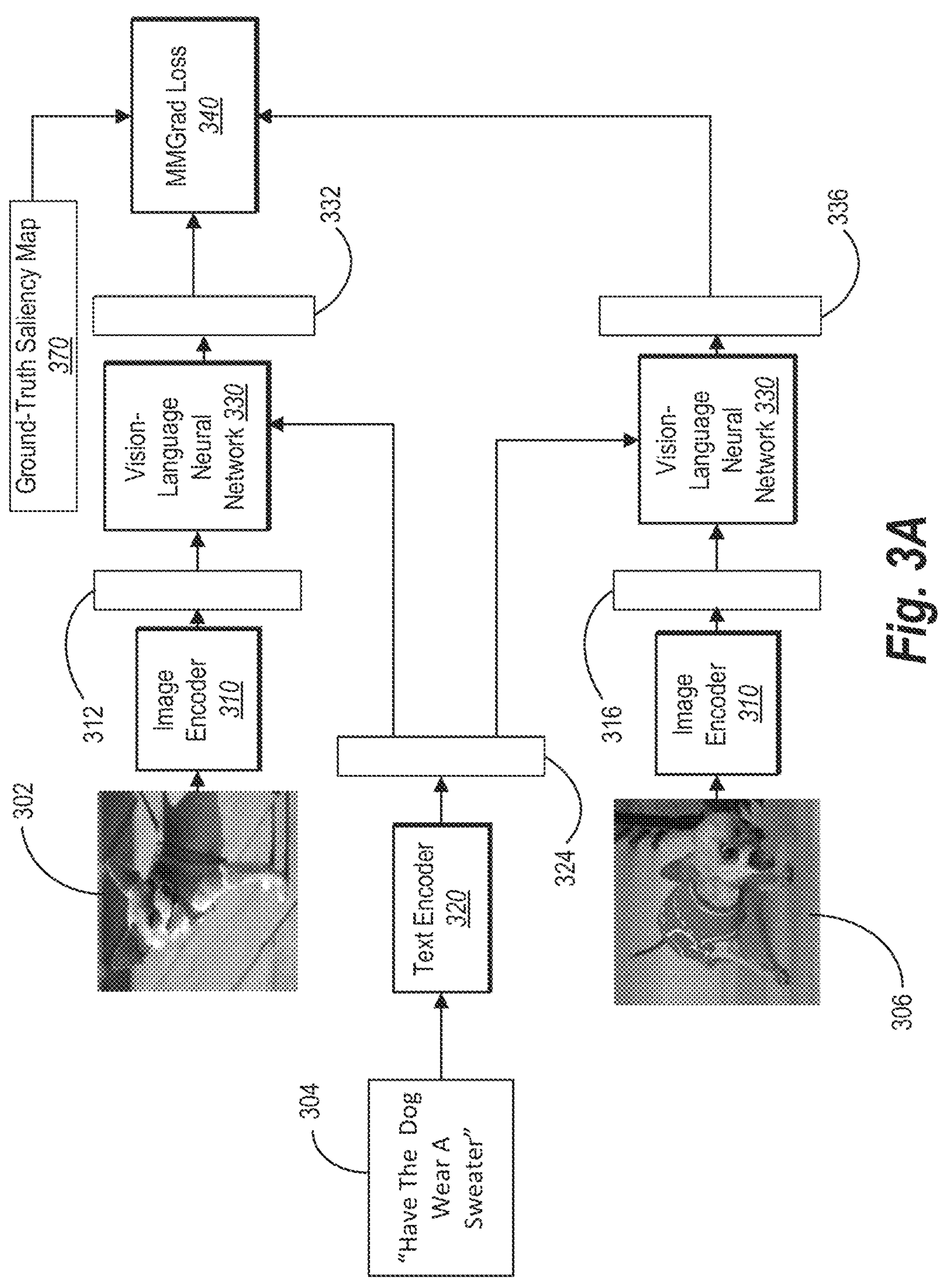
FIGS. 3A-3B illustrate the multi-modal gradient attention system generating feature vectors and a measure of loss based on a reference image, a modification text, and a target image, in accordance with one or more embodiments.

Specifically, FIG. 3A shows the multi-modal gradient attention system 102 obtaining a reference image 302, a modification text 304, and a target image 306. For example, the reference image 302 is a photograph of a dog, the modification text 304 reads "have the dog wear a sweater," and the target image 306 is a photograph of a dog wearing a sweater.

Furthermore, FIG. 3A shows the multi-modal gradient attention system 102 processing the reference image 302 through an image encoder 310 (e.g., similar to the image encoder 210) to generate a reference image feature vector 312. For example, the multi-modal gradient attention system 102 generates, utilizing the image encoder 310 of the image-text comparison machine learning model 114, the reference image feature vector 312 from the reference image 302. Similarly, FIG. 3A shows the multi-modal gradient attention system 102 processing the target image 306 through the image encoder 310 to generate a target image feature vector 316. For example, the multi-modal gradient attention system 102 generates, utilizing the image encoder 310 of the image-text comparison machine learning model 114, the target image feature vector 316 from the target image 306. Additionally, FIG. 3A shows the multi-modal gradient attention system 102 processing the modification text 304 through a text encoder 320 (e.g., similar to the text encoder 220) to generate a text feature token 324. For example, the multi-modal gradient attention system 102 generates, utilizing the text encoder 320 of the image-text comparison machine learning model 114, the text feature token 324 from the modification text 304.

Moreover, in some embodiments, the multi-modal gradient attention system 102 conditions the reference image 302 on the modification text 304. For instance, the multi-modal gradient attention system 102 combines the reference image 302 (or its feature vector) with the modification text 304 (or its feature token) to generate a joint feature vector. For example, FIG. 3A shows the multi-modal gradient attention system 102 processing the reference image feature vector 312 and the text feature token 324 through a vision-language neural network 330 (e.g., similar to the vision-language neural network 230) to generate a reference text-image feature vector 332. For instance, the multi-modal gradient attention system 102 generates the reference text-image feature vector 332 by utilizing the vision-language neural network 330 of the image-text comparison machine learning model 114 to combine the reference image feature vector 312 and the text feature token 324.

Similarly, in some embodiments, the multi-modal gradient attention system 102 conditions the target image 306 on the modification text 304. For instance, the multi-modal gradient attention system 102 combines the target image 306 (or its feature vector) with the modification text 304 (or its feature token) to generate a joint feature vector. For example, FIG. 3A shows the multi-modal gradient attention system 102 processing the target image feature vector 316 and the text feature token 324 through the vision-language neural network 330 to generate a target text-image feature vector 336. For instance, the multi-modal gradient attention system 102 generates the target text-image feature vector 336 by utilizing the vision-language neural network 330 of the image-text comparison machine learning model 114 to combine the target image feature vector 316 and the text feature token 324.

As mentioned above, in some embodiments, the multi-modal gradient attention system 102 utilizes a Siamese model to generate the joint feature vectors. For example, the multi-modal gradient attention system 102 processes the reference image 302, the modification text 304, and the target image 306 through a vision-language Siamese neural network to generate the reference text-image feature vector 332 and the target text-image feature vector 336. For instance, the multi-modal gradient attention system 102 utilizes the same vision-language neural network 330 (e.g., with the same parameters) to generate both text-image feature vectors. In some embodiments, the vision-language Siamese neural network is a vision-language Siamese transformer.

Furthermore, in some implementations, the multi-modal gradient attention system 102 utilizes the reference text-image feature vector and the target text-image feature vector to generate a multi-modal gradient attention map and/or a multi-modal gradient attention loss. For instance, FIG. 3A shows (and FIG. 3B more particularly depicts) the multi-modal gradient attention system 102 utilizing the reference text-image feature vector 332, the target text-image feature vector 336, and a ground-truth saliency map 370 to generate a multi-modal gradient attention loss 340.

As just mentioned, in some embodiments, the multi-modal gradient attention system 102 generates a multi-modal gradient attention loss. For instance, FIG. 3B illustrates the multi-modal gradient attention system 102 generating a multi-modal gradient attention loss 340 in accordance with one or more embodiments.

Figure 3B:
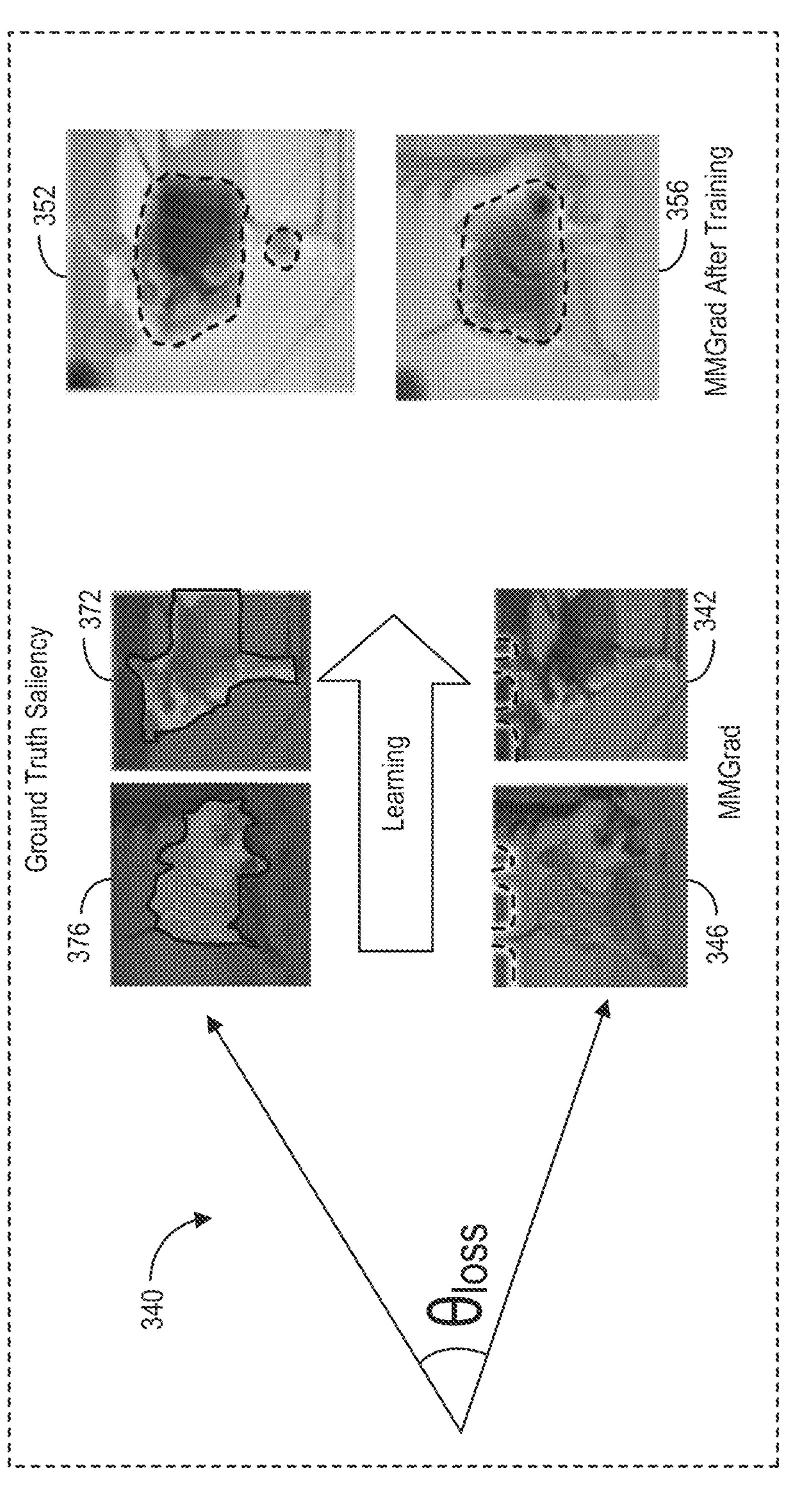

Specifically, FIG. 3B shows the multi-modal gradient attention system 102 utilizing one or more ground truth saliency maps and one or more multi-modal gradient attention maps to generate one or more measures of loss (e.g., one or more multi-modal gradient attention losses 340) to learn parameters of the image-text comparison machine learning model 114. In particular, in some implementations, the multi-modal gradient attention system 102 generates a multi-modal gradient attention map, and then generates the multi-modal gradient attention loss 340 based on the multi-modal gradient attention map. For example, the multi-modal gradient attention system 102 generates the multi-modal gradient attention map from the reference text-image feature vector and the target text-image feature vector.

In some embodiments, the multi-modal gradient attention map reflects a visual grounding of the image-text comparison machine learning model 114 relative to the modification text 304. A visual grounding includes an illustration or a measure of how well a model has learned a region of an image in the representations produced by the model. In particular, in some cases, a visual grounding includes a qualitative or quantitative indication of the model's attentiveness to a particular region. For instance, a visual grounding reflects whether the model is focusing (or has focused) on salient portions of an image.

To illustrate, in some embodiments, the multi-modal gradient attention system 102 generates a multi-modal gradient attention map 346 for the target image 306. For example, the multi-modal gradient attention system 102 generates the multi-modal gradient attention map 346 by combining the reference text-image feature vector 332 and the target text-image feature vector 336. In particular, the multi-modal gradient attention system 102 generates the multi-modal gradient attention map 346 by determining a scalar signal from the reference text-image feature vector 332 and the target text-image feature vector 336. For instance, the multi-modal gradient attention system 102 determines a product (e.g., an inner product, such as a dot product) of the reference text-image feature vector 332 and the target text-image feature vector 336. In some embodiments, the multi-modal gradient attention system 102 determines a cosine similarity between the reference text-image feature vector 332 and the target text-image feature vector 336 as the scalar signal.

Utilizing the scalar signal, in some embodiments, the multi-modal gradient attention system 102 determines a gradient vector. For example, the multi-modal gradient attention system 102 generates a gradient vector based on the scalar signal with respect to parameters of the vision-language neural network 330. To illustrate, the multi-modal gradient attention system 102 generates the gradient vector based on the scalar signal with respect to fully connected parameters of the vision-language neural network 330 of the image-text comparison machine learning model 114. For instance, the multi-modal gradient attention system 102 generates the gradient vector with respect to the last dense (fully connected) layer of the vision-language neural network 330.

In some embodiments, the multi-modal gradient attention system 102 generates the multi-modal gradient attention map 346 by combining the gradient vector with the target text-image feature vector 336. For instance, the multi-modal gradient attention system 102 combines, for each dimension of the last dense layer of the vision-language neural network 330, a component of the gradient vector with a corresponding portion of the target text-image feature vector 336. In some cases, the multi-modal gradient attention system 102 reshapes the target text-image feature vector 336 according to the dimensions of the last dense layer of the vision-language neural network 330. In some embodiments, the multi-modal gradient attention system 102 multiplies the components of the gradient vector with the corresponding portions of the target text-image feature vector 336, sums the products, and processes the sum through a rectified linear unit.

The multi-modal gradient attention techniques described above can be represented symbolically. For example, in some implementations the multi-modal gradient attention system 102 generates the scalar signal as follows:

$$s = \frac{f_{ref-mod} \cdot f_{tgt-mod}}{\|f_{ref-mod}\|_2 \|f_{tgt-mod}\|_2}$$

where s is the scalar signal, $f_{ref\text{-}mod}$ is the reference text-image feature vector, and $f_{tgt\text{-}mod}$ is the target text-image feature vector. Furthermore, in one or more embodiments the multi-modal gradient attention system 102 generates the gradient vector as a derivative with respect to the last fully connected layer of the vision-language neural network:

$$g = \frac{\partial s}{\partial L}$$

where g is the gradient vector and L is the last fully connected layer of the vision-language neural network (e.g., its parameters). Moreover, the multi-modal gradient attention system 102 generates the multi-modal gradient attention map by reshaping the text-image feature vector $f_{tgt\text{-}mod}$ (or $f_{ref\text{-}mod}$) such that $f \in \mathcal{R}^{d \times m \times n}$, where d is the feature dimensionality (and equals the number of neurons in the last layer of the vision-language neural network) and m×n is the spatial size of the multi-modal gradient attention map. In one or more implementations, the multi-modal gradient attention system 102 generates the multi-modal gradient attention map as follows:

$$M = ReLU\left(\sum_{i=1}^{d} g_i f^i_{tgt-mod}\right)$$

where M is the multi-modal gradient attention map and where each $$f^i_{tgt-mod} \in \mathcal{R}^{m \times n}$$

and $g_i$ refers to the importance of the ith neuron of the last layer of the vision-language neural network in retrieving the target image.

Similarly, in some embodiments, the multi-modal gradient attention system 102 generates a multi-modal gradient attention map 342 for the reference image 302. For instance, the multi-modal gradient attention system 102 generates the gradient vector (e.g., from the scalar signal), and generates the multi-modal gradient attention map 342 by combining the gradient vector with the reference text-image feature vector 332, similar to the description above for generating the multi-modal gradient attention map 346.

As mentioned, in some implementations, the multi-modal gradient attention system 102 generates one or more saliency maps for training the image-text comparison machine learning model 114. To illustrate, the multi-modal gradient attention system 102 generates a saliency map 376 for the target image 306. For example, the multi-modal gradient attention system 102 generates the saliency map 376 based on the target image 306 and the modification text 304.

A saliency map includes a representation that indicates salient or relevant (e.g., to an observer) regions of an image. For instance, a saliency map includes a binary matte comprising unity values at pixel locations within the salient regions, and zero values at pixel locations outside of the salient regions. In some cases, a saliency map includes a ground truth map of salient regions of an image (e.g., utilized for training a machine learning model to ground visual attention on the salient regions).

In some implementations, the multi-modal gradient attention system 102 generates the saliency map 376 by extracting key phrases from the modification text 304 and utilizing the key phrases as prompt inputs into a saliency detection machine learning model. In one or more implementations, the multi-modal gradient attention system 102 utilizes the saliency detection machine learning model to generate intermediate saliency maps corresponding to each key phrase. Moreover, in one or more implementations, the multi-modal gradient attention system 102 aggregates each intermediate saliency map and binarizes the resulting aggregation to generate a ground truth saliency map for a digital image. As illustrated in FIG. 3B, in some embodiments, the saliency map 376 is a binary matte indicating salient regions of the target image 306.

In some implementations, the multi-modal gradient attention system 102 utilizes a text-prompt-conditioned image segmentation model as the saliency detection model, such as the model described by Timo Lüddecke and Alexander Ecker in *Image Segmentation Using Text and Image Prompts*, in Proceedings of the IEEE/CVF Conference on Computer Vision and Pattern Recognition (CVPR), pages 7086-7096, June 2022, which is incorporated in its entirety herein by reference. The multi-modal gradient attention system 102 can utilize a variety of saliency detection machine learning model architectures. Furthermore, in some implementations, the multi-modal gradient attention system 102 utilizes a text mining model to extract the key phrases from the modification text 304, such as a model described by Stuart Rose, Dave Engel, Nick Cramer, and Wendy Cowley in *Automatic Keyword Extraction from Individual Documents*, in Text Mining: Applications and Theory, pages 1-20, 2010, which is incorporated in its entirety herein by reference. The multi-modal gradient attention system 102 can utilize a variety of machine learning model architectures to extract key phrases from the modification text.

Similarly, in some embodiments, the multi-modal gradient attention system 102 generates a saliency map 372 for the reference image 302. For example, the multi-modal gradient attention system 102 generates the saliency map 372 based on the reference image 302 and the modification text 304. As illustrated in FIG. 3B, in some embodiments, the saliency map 372 is a binary matte indicating salient regions of the reference image 302.

As mentioned, in some implementations, based on the multi-modal gradient attention map(s) and the saliency map(s), the multi-modal gradient attention system 102 learns parameters of the image-text comparison machine learning model 114. For example, as described in additional below, the multi-modal gradient attention system 102 modifies parameters of the image-text comparison machine learning model 114 by comparing the multi-modal gradient attention map 342 and the saliency map 372 of the reference image 302 based on the modification text 304. As another example, the multi-modal gradient attention system 102 modifies parameters of the image-text comparison machine learning model 114 by comparing the multi-modal gradient attention map 346 and the saliency map 376 of the target image 306 based on the modification text 304.

To illustrate, in some implementations, the multi-modal gradient attention system 102 determines a multi-modal gradient attention loss. For instance, the multi-modal gradient attention system 102 determines the multi-modal gradient attention loss 340 by comparing the multi-modal gradient attention map 346 and the saliency map 376. In particular, the multi-modal gradient attention system 102 determines the multi-modal gradient attention loss 340 by determining a product (e.g., an inner product) of the multi-modal gradient attention map and the saliency map. Based on the multi-modal gradient attention loss 340, in some embodiments, the multi-modal gradient attention system 102 modifies the parameters of the image-text comparison machine learning model 114.

The multi-modal gradient attention loss can be represented symbolically. For example, in some embodiments, the multi-modal gradient attention system 102 generates the multi-modal gradient attention loss as follows:

$$\mathcal{L}_{MMGrad} = 1 - \frac{\langle M, S \rangle}{\|M\|\|S\|}$$

where S is the saliency map, $\langle M, S \rangle$ represents an inner product between the flattened versions of the multi-modal gradient attention map and the saliency map, and the denominator comprises the corresponding Euclidean norms. The multi-modal gradient attention system 102 can utilize the multi-modal gradient attention loss to modify parameters of the vision-language neural network 330 (e.g., utilizing back propagation and gradient descent to reduce the measure of loss and iteratively improve accuracy across training iterations).

As further shown in FIG. 3B, in some implementations, the multi-modal gradient attention system 102 generates a visually grounded multi-modal gradient attention map from the learning process. For example, the multi-modal gradient attention system 102 generates a visually grounded multi-modal gradient attention map 352 for the reference image 302. As another example, the multi-modal gradient attention system 102 generates a visually grounded multi-modal gradient attention map 356 for the target image 306. As shown in FIG. 3B, and as described further below, the visually grounded multi-modal gradient attention maps 352, 356 demonstrate improved visual grounding of the image-text comparison machine learning model 114 from the learning process. For example, the multi-modal gradient attention map 356 has generally high values on and near the sweater of the dog, and generally low values over regions of the target image 306 that are away from the sweater. In FIG. 3B, the high-value regions of the multi-modal gradient attention maps 352, 356 are indicated by enclosure in dashed lines.

Figure 4A:
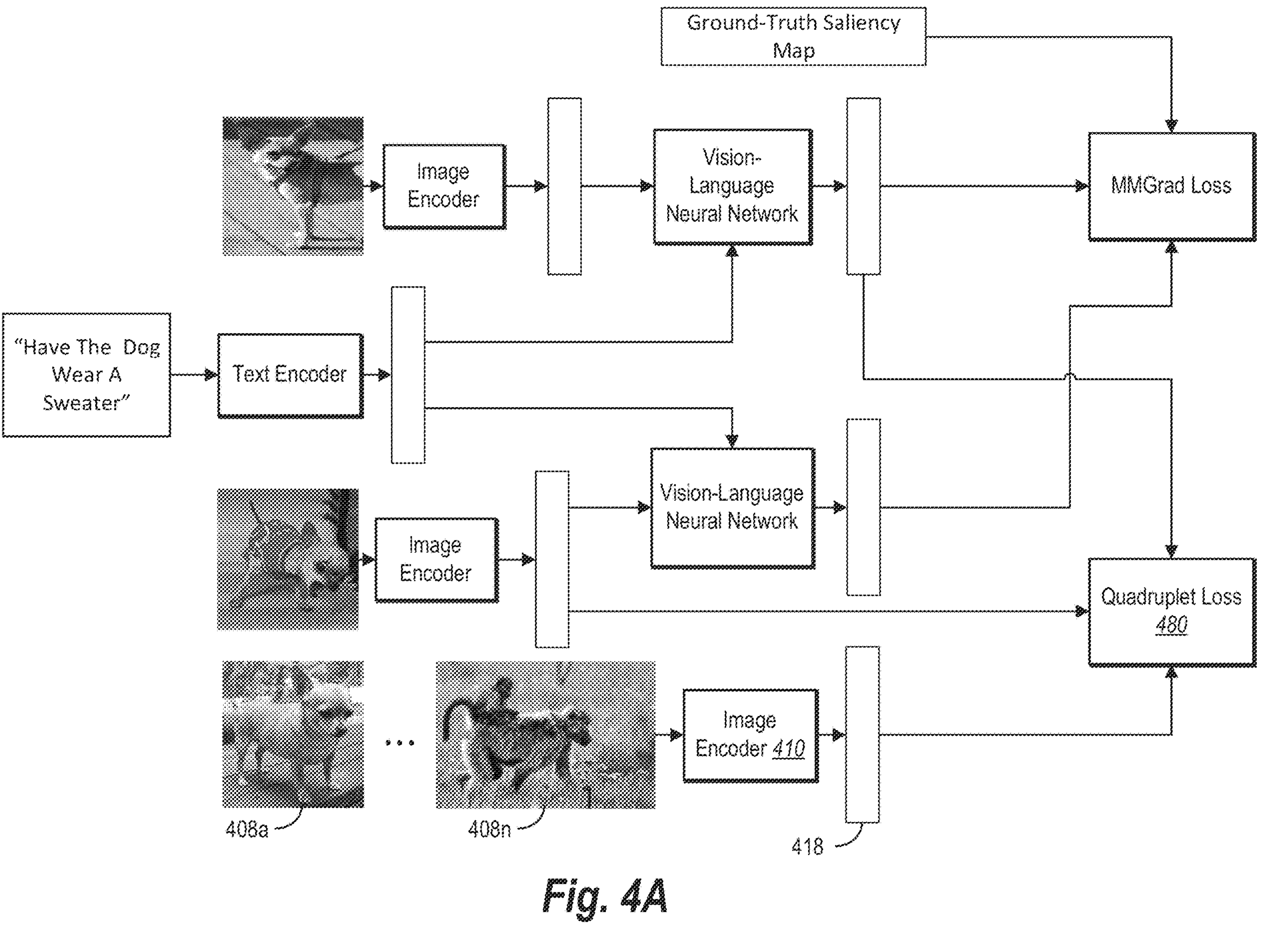
FIGS. 4A-4B illustrate the multi-modal gradient attention system generating a quadruplet loss in accordance with one or more embodiments.

In addition to utilizing the multi-modal gradient attention loss 340, in some embodiments, the multi-modal gradient attention system 102 utilizes other losses (e.g., in addition to the multi-modal gradient attention loss 340) to train the image-text comparison machine learning model 114. For instance, FIG. 4A illustrates the multi-modal gradient attention system 102 generating a quadruplet loss in accordance with one or more embodiments. FIG. 4A repeats the components of FIG. 3A and adds additional components for generating the quadruplet loss. Thus, the description above of FIGS. 3A and 3B applies equally to FIG. 4A.

Specifically, FIG. 4A shows the multi-modal gradient attention system 102 obtaining a set of digital images 408*a*-408*n*. For instance, the multi-modal gradient attention system 102 samples the digital images 408*a*-408*n* from a training dataset. In some implementations, the multi-modal gradient attention system 102 utilizes the digital images 408*a*-408*n* as negative samples for training. To illustrate, the multi-modal gradient attention system 102 processes the digital images 408*a*-408*n* through an image encoder 410 (e.g., the image encoder 310) to generate feature vectors 418 (e.g., a feature vector for each digital image) of the digital images 408*a*-408*n*.

In some implementations, the multi-modal gradient attention system 102 utilizes the feature vectors 418 for the digital images 408*a*-408*n*, together with the feature vector 316 for the target image 306 and the reference text-image feature vector 332 for the reference image 302, to generate a quadruplet loss 480. For instance, the multi-modal gradient attention system 102 utilizes the reference text-image feature vector 332 as an anchor sample, the feature vector 316 as a positive sample, a first feature vector of the feature vectors 418 as a first negative sample, and a second feature vector of the feature vectors 418 as a second negative sample. The multi-modal gradient attention system 102 determines distances between the samples to generate the quadruplet loss 480.

As just mentioned, in some implementations, the multi-modal gradient attention system 102 determines the quadruplet loss 480 by determining distances between samples. For instance, FIG. 4B illustrates the multi-modal gradient attention system 102 generating the quadruplet loss 480 in accordance with one or more embodiments.

Figure 4B:
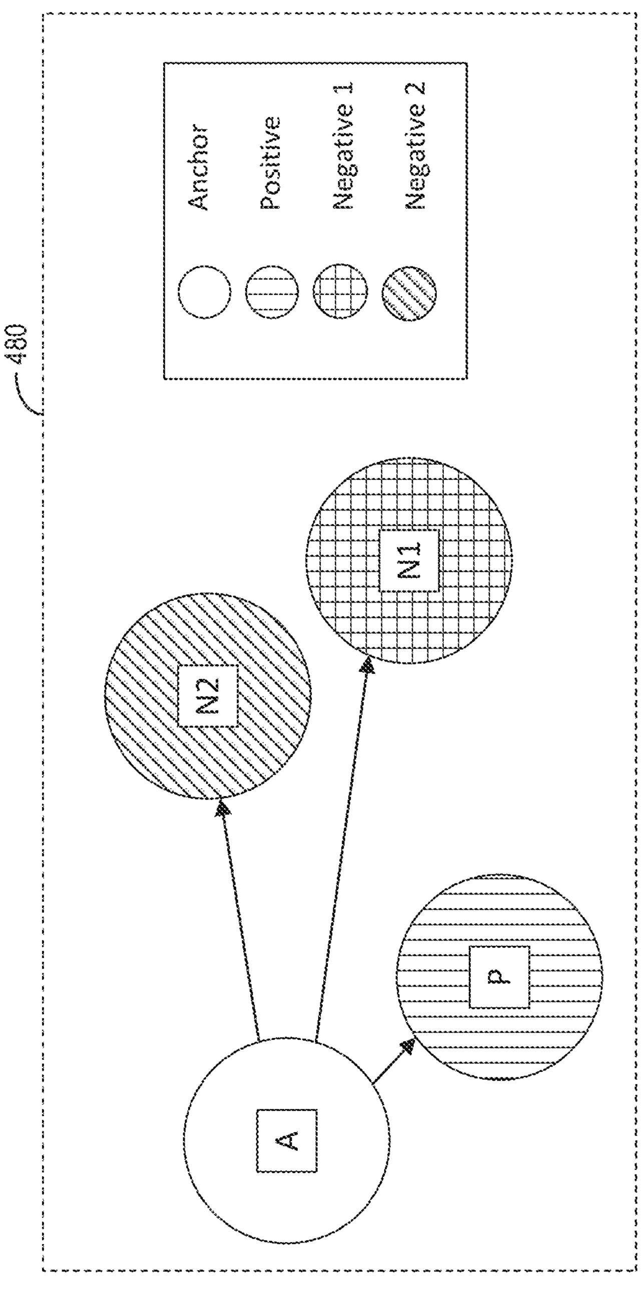

Specifically, FIG. 4B shows the multi-modal gradient attention system 102 determining a first distance between an anchor sample A and a positive sample P, a second distance between the anchor sample A and a first negative sample N1, and a third distance between the anchor sample A and a second negative sample N2. In some embodiments, the multi-modal gradient attention system 102 utilizes the quadruplet loss 480 to maintain a discriminative feature space during training of the image-text comparison machine learning model 114. For instance, the multi-modal gradient attention system 102 aims to determine a target image (represented by the positive sample) with a relatively short first distance from the reference image (represented by the anchor sample), while maintaining relatively long second and third distances from the additional digital images (represented by the first and second negative samples). Thus, the multi-modal gradient attention system 102 learns to reduce the distance between feature representations of similar images in feature space (e.g., by penalizing distance between positive image pairs in training) while learning to increase the distance between dissimilar images in feature space (e.g., by penalizing proximity between negative image pairs in training).

The quadruplet loss can be represented symbolically. For example, the multi-modal gradient attention system 102 generates the quadruplet loss as follows:

$$\mathcal{L}_{quad} = \max(d_1^2 - d_2^2 + m_1, 0) + \max(d_1^2 - d_3^2 + m_2, 0)$$

where $d_1$ is the distance between the anchor and the positive, $d_2$ is the distance between the anchor and the first negative, and $d_3$ is the distance between the anchor and the second negative.

As mentioned, in some implementations, the multi-modal gradient attention system 102 utilizes both a multi-modal gradient attention loss and a quadruplet loss to train the image-text comparison machine learning model 114. For example, the multi-modal gradient attention system 102 combines the multi-modal gradient attention loss 340 and the quadruplet loss 480 into an overall loss function. Then, the multi-modal gradient attention system 102 utilizes the overall loss function to modify parameters of the image-text comparison machine learning model 114.

The overall loss can be represented symbolically. For example, the multi-modal gradient attention system 102 generates the overall loss as follows:

$$L = \lambda\mathcal{L}_{MMGrad} + (1 - \lambda)\mathcal{L}_{quad}$$

where $\lambda$ is a scalar weight.

The first term in this equation encourages the model to pay attention to the correct local regions when generating the feature vectors, while the second term encourages the model to maintain discriminative features.

As discussed above, in some embodiments, the multi-modal gradient attention system 102 trains a machine learning model to improve visual grounding relative to salient regions of images (e.g., based on a modification text). For instance, FIG. 5A illustrates the multi-modal gradient attention system 102 training the image-text comparison machine learning model 114 utilizing a reference image, a target image, and a modification text, in accordance with one or more embodiments.

Figures 5A, 5B:
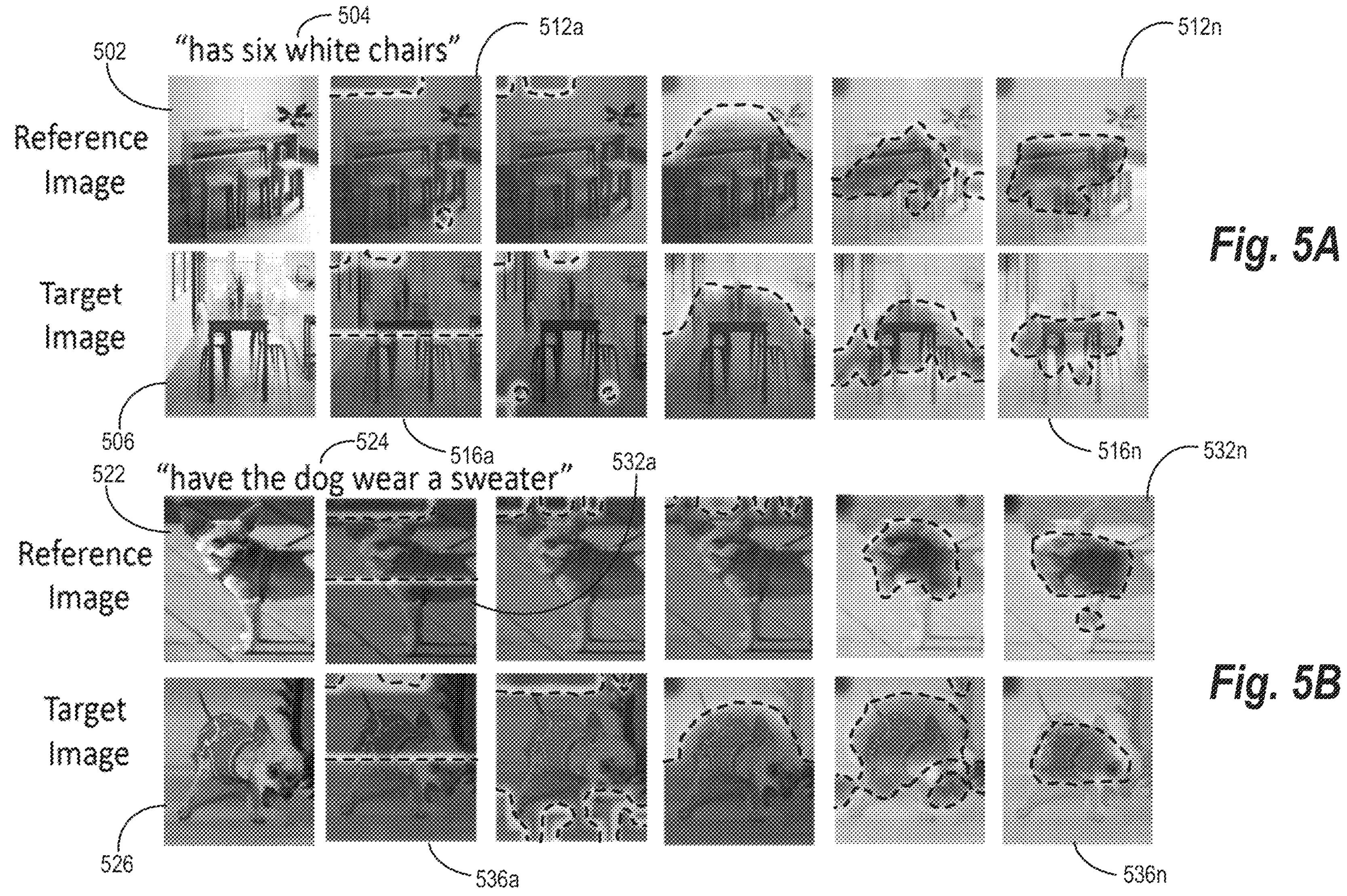
FIGS. 5A-5B illustrate the multi-modal gradient attention system training an image-text comparison machine learning model utilizing a reference image, a target image, and a modification text, in accordance with one or more embodiments.

Specifically, FIG. 5A shows the multi-modal gradient attention system 102 obtaining a reference image 502, a modification text 504, and a target image 506. For example, the reference image 502 is a photograph of a dining table with three stools, the modification text 504 reads "has six white chairs," and the target image 506 is a photograph of a dining table with six white chairs. For instance, the target image 506 is close to a semantic intent of the modification text 504 for the reference image 502.

As depicted in FIG. 5A, the multi-modal gradient attention system 102 utilizes the multi-modal gradient attention techniques described above to train the image-text comparison machine learning model 114 to attend its visual grounding to the salient portions of the images (e.g., the dining table and stools of the reference image 502 and the dining table and chairs of the target image 506). Throughout several training epochs, the multi-modal gradient attention system 102 modifies parameters of the image-text comparison machine learning model 114 to effect a change in the visual grounding of the image-text comparison machine learning model 114. FIG. 5A shows multi-modal gradient attention maps 512*a*-512*n* (corresponding to the reference image 502), and multi-modal gradient attention maps 516*a*-516*n* (corresponding to the target image 506). These multi-modal gradient attention maps 512*a*-512*n* and 516*a*-516*n* provide a qualitative view of the improvement of the visual grounding of the image-text comparison machine learning model 114. In FIG. 5A, high-value regions of the multi-modal gradient attention maps 512*a*-512*n* and 516*a*-516*n* are distinguished from low value regions by dashed lines. Specifically, as the training progresses through the epochs, the localization of the attention of the image-text comparison machine learning model 114 improves relative to the salient regions of the images.

Similarly, FIG. 5B illustrates the multi-modal gradient attention system 102 training the image-text comparison machine learning model 114 utilizing another reference image, another target image, and another modification text, in accordance with one or more embodiments.

Specifically, FIG. 5B shows the multi-modal gradient attention system 102 obtaining a reference image 522, a modification text 524, and a target image 526. For example, the reference image 522 is a photograph of a dog, the modification text 524 reads "have the dog wear a sweater," and the target image 526 is a photograph of a dog wearing a sweater. For instance, the target image 526 is close to a semantic intent of the modification text 524 for the reference image 522.

As depicted in FIG. 5B, the multi-modal gradient attention system 102 utilizes the multi-modal gradient attention techniques described above to train the image-text comparison machine learning model 114 to attend its visual grounding to the salient portions of the images (e.g., the withers, shoulder, and chest of the dog in the reference image 522 and the sweater in the target image 526). Throughout several training epochs, the multi-modal gradient attention system 102 modifies parameters of the image-text comparison machine learning model 114 to effect a change in the visual grounding of the image-text comparison machine learning model 114. FIG. 5B shows multi-modal gradient attention maps 532*a*-532*n* (corresponding to the reference image 522), and multi-modal gradient attention maps 536*a*-536*n* (corresponding to the target image 526). These multi-modal gradient attention maps 532*a*-532*n* and 536*a*-536*n* provide a qualitative view of the improvement of the visual grounding of the image-text comparison machine learning model 114. In FIG. 5B, high-value regions of the multi-modal gradient attention maps 532*a*-532*n* and 536*a*-536*n* are distinguished from low value regions by dashed lines. Specifically, as the training progresses through the epochs, the localization of the attention of the image-text comparison machine learning model 114 improves relative to the salient regions of the images.

As discussed above, in some embodiments, the multi-modal gradient attention system 102 improves the visual attention of machine learning models relative to text conditioning. For instance, FIG. 6 illustrates a comparison of outputs of the multi-modal gradient attention system 102 with outputs of a machine learning model that does not use multi-modal gradient attention, in accordance with one or more embodiments.

Figure 6:
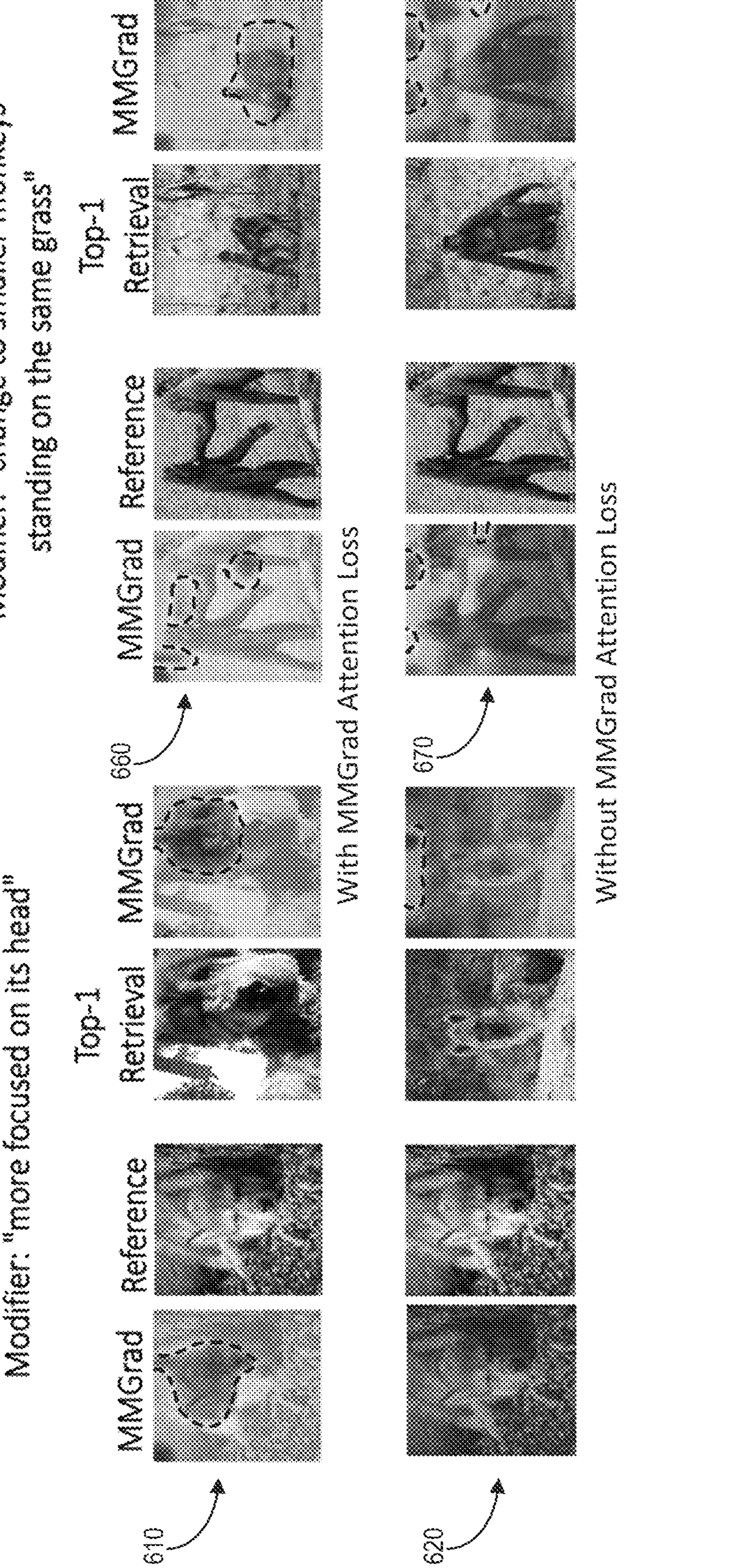
FIG. 6 illustrates a comparison of outputs of the multi-modal gradient attention system with outputs of a machine learning model that does not use multi-modal gradient attention, in accordance with one or more embodiments.

Specifically, FIG. 6 shows a first set of images 610 with a modification text, including a reference image, a retrieval image, and their respective multi-modal gradient attention maps. In particular, the reference image depicts a canine lying on the ground, and the modification text reads "more focused on its head." The multi-modal gradient attention system 102 utilizes the image-text comparison machine learning model 114 to select a retrieval image (e.g., a target image) that matches the semantic intent of the modification text for the reference image. In particular, the top-ranked retrieval image (utilizing multi-modal gradient attention) depicts a close-up view of a canine's head.

Additionally, FIG. 6 shows multi-modal gradient attention maps ("MMGrad") for both the reference image and the top-ranked retrieval image in the set of images 610. As shown, these multi-modal gradient attention maps demonstrate good visual attention of the image-text comparison machine learning model 114. For instance, the multi-modal gradient attention map for the reference image shows high values on and near the canine's head, and low values elsewhere. Similarly, the multi-modal gradient attention map for the top-ranked target image shows high values on the canine's head, and low values elsewhere. As shown in FIG. 6, high-value regions of the multi-modal gradient attention maps are distinguished from low value regions by dashed lines.

By contrast, FIG. 6 shows a second set of images 620 with the same reference image and modification text as the set of images 610, but with outputs generated by a model that does not utilize multi-modal gradient attention. In particular, the top-ranked retrieval image by the other model depicts an animal, but without more focus on the animal's head. Additionally, FIG. 6 shows attention maps for both the reference image and the top-ranked image in the set of images 620. As shown, these attention maps are not as accurate as the multi-modal gradient attention maps from the set of images 610. For instance, the attention map for the reference image has low values throughout the map, including on and around the canine's head. Additionally, the attention map for the top-ranked target image has generally high values throughout the map, including away from the animal's head.

Similarly, FIG. 6 shows a third set of images 660 with a modification text, including a reference image, a retrieval image, and their respective multi-modal gradient attention maps. In particular, the reference image depicts two apes associating with each other around grass, and the modification text reads "change to smaller monkeys standing on the same grass." The multi-modal gradient attention system 102 utilizes the image-text comparison machine learning model 114 to select a retrieval image (e.g., a target image) that matches the semantic intent of the modification text for the reference image. In particular, the top-ranked retrieval image (utilizing multi-modal gradient attention) depicts two small monkeys associating with each other around grass.

Additionally, FIG. 6 shows multi-modal gradient attention maps ("MMGrad") for both the reference image and the top-ranked retrieval image in the set of images 660. As shown, these multi-modal gradient attention maps demonstrate good visual attention of the image-text comparison machine learning model 114. For instance, the multi-modal gradient attention map for the reference image shows high values around the apes, and low values away from the apes. Similarly, the multi-modal gradient attention map for the top-ranked target image shows high values over the monkeys, and low values away from the monkeys.

By contrast, FIG. 6 shows a fourth set of images 670 with the same reference image and modification text as the set of images 660, but with outputs generated by a model that does not utilize multi-modal gradient attention. In particular, the top-ranked retrieval image by the other model depicts a single ape of the same size as the two apes in the reference image. Additionally, FIG. 6 shows attention maps for both the reference image and the top-ranked image in the set of images 670. As shown, these attention maps are not as accurate as the multi-modal gradient attention maps from the set of images 660. For instance, the attention map for the reference image has high values away from the apes, and lower values near the apes. Additionally, the attention map for the top-ranked target image has high values away from the ape, and lower values near the ape.

As mentioned, in some embodiments, the multi-modal gradient attention system 102 provides one or more multi-modal gradient attention maps for display via a user interface. For instance, FIG. 7 illustrates the multi-modal gradient attention system 102 providing multi-modal gradient attention maps for display in accordance with one or more embodiments.

Figure 7:
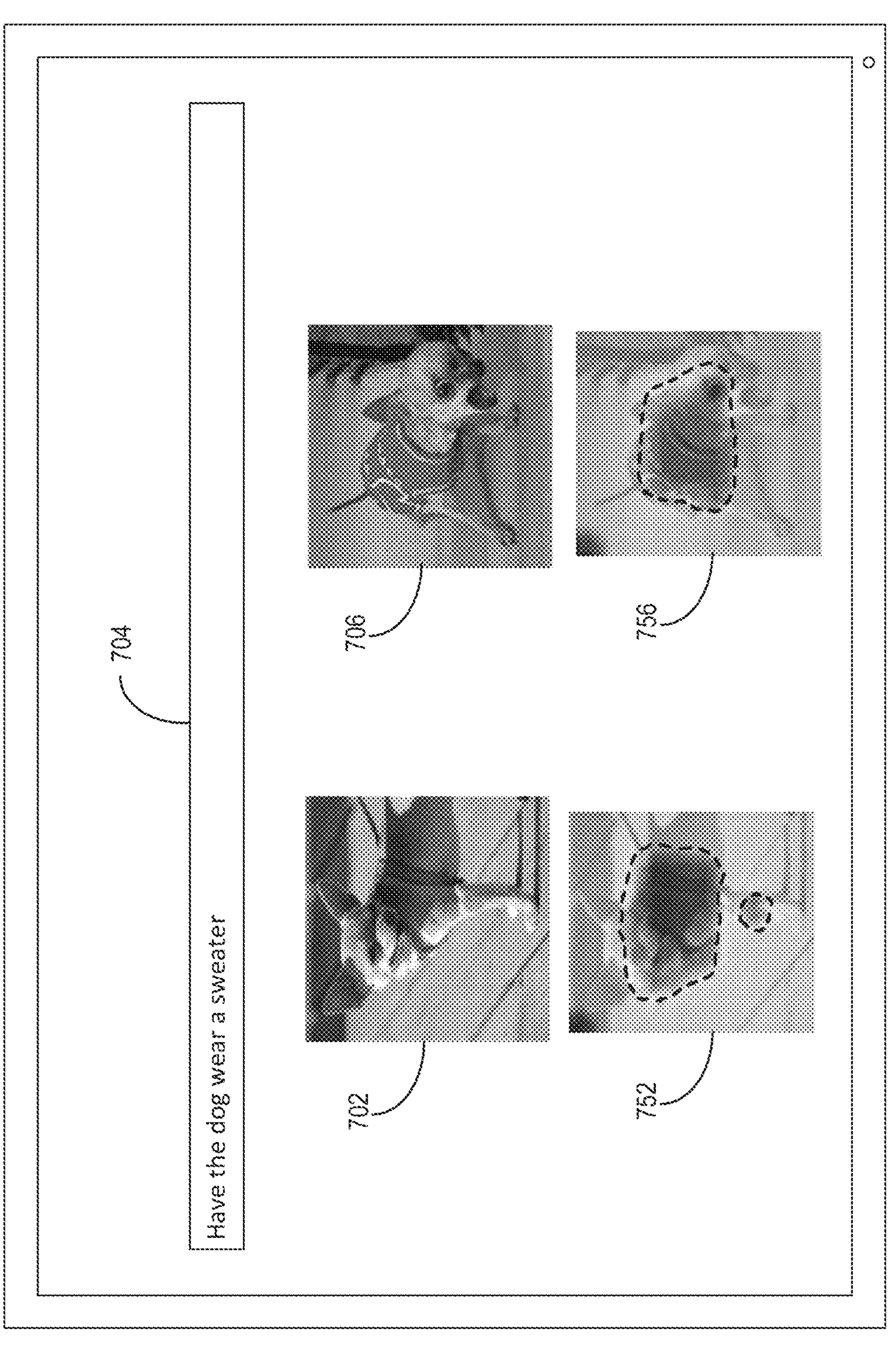
FIG. 7 illustrates the multi-modal gradient attention system providing multi-modal gradient attention maps for display via a user interface in accordance with one or more embodiments.

Specifically, FIG. 7 shows the multi-modal gradient attention system 102 obtaining a digital image 702 and a modification text 704 for the digital image 702. In some cases, the multi-modal gradient attention system 102 trains a machine learning model utilizing a target image (e.g., an additional digital image 706). In some cases, the multi-modal gradient attention system 102 utilizes the machine learning model (e.g., trained to compare images with modification texts) to retrieve a retrieval image (e.g., the additional digital image 706). As described above, in some embodiments, the multi-modal gradient attention system 102 generates a multi-modal gradient attention map 752 for the digital image 702. Similarly, in some embodiments, the multi-modal gradient attention system 102 generates a multi-modal gradient attention map 756 for the additional digital image 706.

Whether for a training scenario or an implementation (e.g., retrieval) scenario, in some embodiments, the multi-modal gradient attention system 102 provides a multi-modal gradient attention map for display via a user device. For instance, the multi-modal gradient attention system 102 provides the multi-modal gradient attention map 752 and/or the multi-modal gradient attention map 756 for display via a graphical user interface of a client device. In particular, in some implementations, the multi-modal gradient attention system 102 provides the multi-modal gradient attention map 752 for display with the digital image 702 (e.g., a reference image) via the graphical user interface. Similarly, in some implementations, the multi-modal gradient attention system 102 provides the multi-modal gradient attention map 756 for display with the additional digital image 706 (e.g., a target image) via the graphical user interface.

As mentioned, in some embodiments, the multi-modal gradient attention system 102 selects a digital image for retrieval in response to a reference image and a modification text. For instance, FIG. 8 illustrates the multi-modal gradient attention system 102 selecting an image from a set of candidate images for image retrieval in accordance with one or more embodiments.

Figure 8:
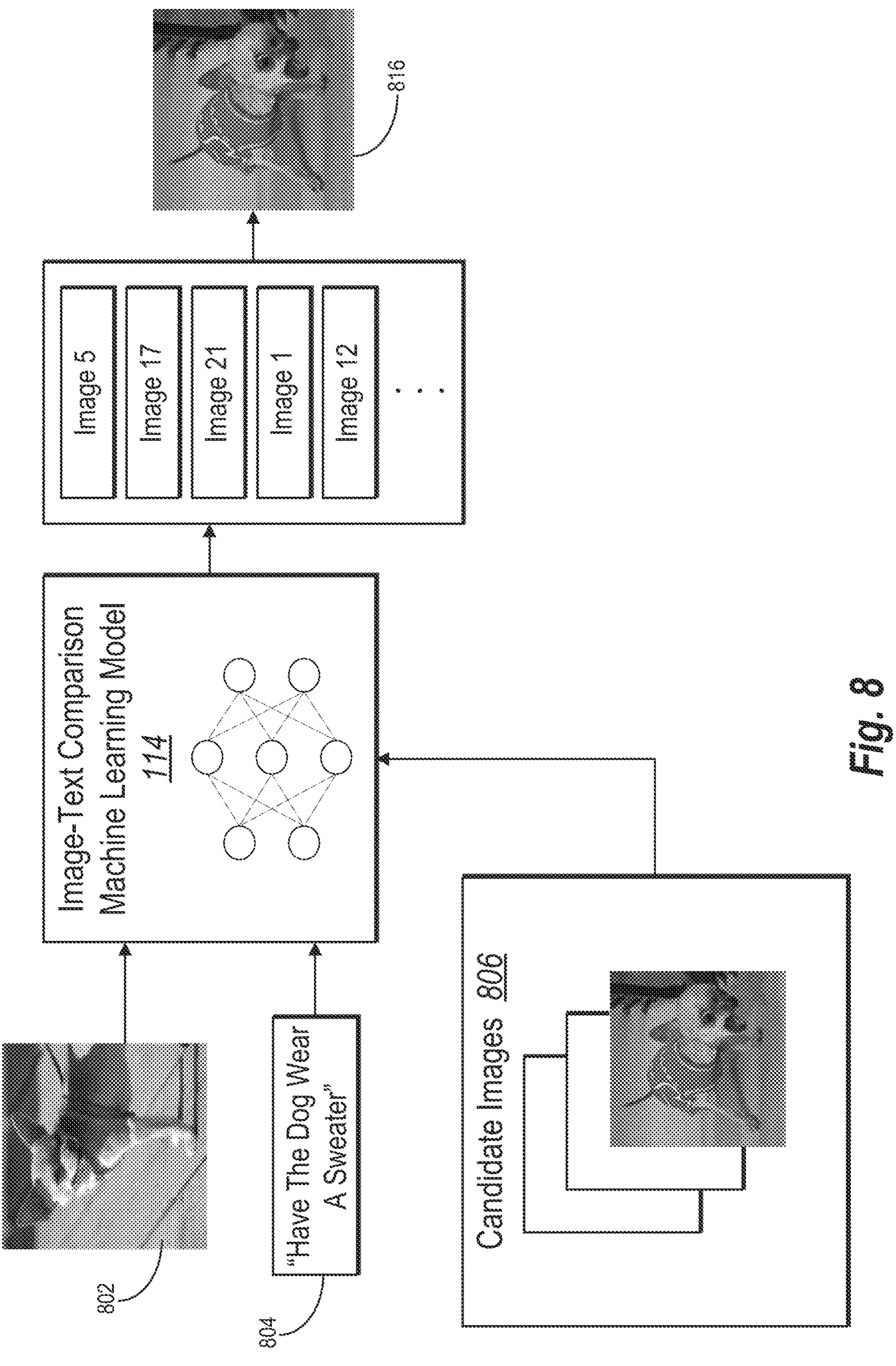
FIG. 8 illustrates the multi-modal gradient attention system selecting an image from a set of candidate images for image retrieval in accordance with one or more embodiments.

Specifically, FIG. 8 shows the multi-modal gradient attention system 102 receiving a reference image 802 and a modification text 804. In some implementations, the multi-modal gradient attention system 102 searches a set of candidate images 806 to determine a retrieval image. For instance, the multi-modal gradient attention system 102 utilizes the image-text comparison machine learning model 114 to analyze the images in the set of candidate images 806 and determine whether the images match (or approach) a semantic intent of the modification text 804 for the reference image 802. To illustrate, in some embodiments, the multi-modal gradient attention system 102 ranks the images in the set of candidate images 806 to determine a top-ranked image 816 for retrieval (e.g., for display via a user interface) in response to the reference image 802 and the modification text 804.

For example, in some implementations, the multi-modal gradient attention system 102 determines, utilizing the image-text comparison machine learning model 114, predicted measures of similarity between the reference image 802 conditioned on the modification text 804 and each of the images in the set of candidate images 806. In some embodiments, the multi-modal gradient attention system 102 utilizes the scalar signal described above as the predicted measure of similarity. In some embodiments, the multi-modal gradient attention system 102 utilizes another similarity metric as the predicted measure of similarity. Other examples include, but are not limited to, the multi-modal gradient attention system 102 determining a correlation metric, a Minkowski distance (e.g., a Euclidean distance, a Manhattan distance, a Chebyshev distance), a Canberra distance, a Hamming distance, or some other similarity metric.

As mentioned, in some implementations, the multi-modal gradient attention system 102 selects the top-ranked image 816 for retrieval. For instance, the multi-modal gradient attention system 102 selects, based on the predicted measures of similarity, the top-ranked image 816 for display via a graphical user interface. For example, in some cases, the top-ranked image 816 has the highest predicted measure of similarity to the reference image 802 conditioned on the modification text 804 (e.g., the smallest scalar signal or the smallest distance metric) of all the images in the set of candidate images 806.

As also mentioned, in some implementations, the multi-modal gradient attention system 102 performs multi-modal gradient attention techniques (e.g., generating a multi-modal gradient attention map) to indicate a visual grounding of the image-text comparison machine learning model 114 relative to a modification text. Similarly, in some implementations, the multi-modal gradient attention system 102 generates the multi-modal gradient attention map, which reflects a visual grounding of the image-text comparison machine learning model 114 in determining a predicted measure of similarity. For example, the multi-modal gradient attention map reflects a degree of similarity between a target image and a reference image conditioned on a modification text.

Figure 9:
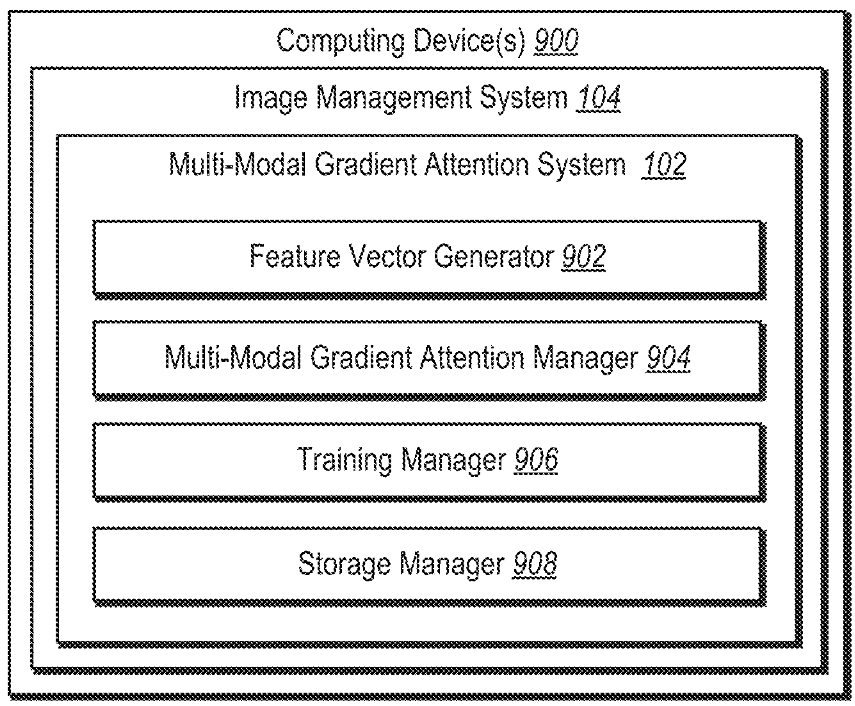
FIG. 9 illustrates a diagram of an example architecture of the multi-modal gradient attention system in accordance with one or more embodiments.

Turning now to FIG. 9, additional detail will be provided regarding components and capabilities of one or more embodiments of the multi-modal gradient attention system 102. In particular, FIG. 9 illustrates an example multi-modal gradient attention system 102 executed by a computing device(s) 900 (e.g., the server device(s) 106 or the client device 108). As shown by the embodiment of FIG. 9, the computing device(s) 900 includes or hosts the image management system 104 and/or the multi-modal gradient attention system 102. Furthermore, as shown in FIG. 9, the multi-modal gradient attention system 102 includes a feature vector generator 902, a multi-modal gradient attention manager 904, a training manager 906, and a storage manager 908.

As shown in FIG. 9, the multi-modal gradient attention system 102 includes a feature vector generator 902. In some implementations, the feature vector generator 902 generates a feature vector from a digital image, from a modification text, and/or from both a digital image and a modification text. For example, in some implementations, the feature vector generator 902 generates a joint feature vector, as described above.

In addition, as shown in FIG. 9, the multi-modal gradient attention system 102 includes a multi-modal gradient attention manager 904. In some implementations, the multi-modal gradient attention manager 904 can generate a multi-modal gradient attention map utilizing feature vectors from a reference image, a target image, and a modification text. For example, the multi-modal gradient attention manager 904 determines a scalar signal from a reference text-image feature vector and a target text-image feature vector, generates a gradient vector based on the scalar signal, and generates the multi-modal gradient attention map from the gradient vector.

Moreover, as shown in FIG. 9, the multi-modal gradient attention system 102 includes a training manager 906. In some implementations, the training manager 906 trains (e.g., modifies parameters of) one or more machine learning models, as described above, including the image-text comparison machine learning model 114. In some implementations, the training manager 906 generates a multi-modal gradient attention loss and utilizes the multi-modal gradient attention loss to modify parameters of the one or more machine learning models.

Furthermore, as shown in FIG. 9, the multi-modal gradient attention system 102 includes a storage manager 908. In some implementations, the storage manager 908 stores information (e.g., via one or more memory devices) on behalf of the multi-modal gradient attention system 102. For example, the storage manager 908 includes digital images, text strings, feature vectors (e.g., text-image feature vectors), scalar signals, gradient vectors, weights, multi-modal gradient attention maps, saliency maps, and/or multi-modal gradient attention losses. Additionally, in some implementations, the storage manager 908 stores parameters of one or more machine learning model, including the image-text comparison machine learning model 114.

Each of the components 902-908 of the multi-modal gradient attention system 102 can include software, hardware, or both. For example, the components 902-908 can include one or more instructions stored on a computer-readable storage medium and executable by processors of one or more computing devices, such as a client device or server device. When executed by the one or more processors, the computer-executable instructions of the multi-modal gradient attention system 102 can cause the computing device(s) to perform the methods described herein. Alternatively, the components 902-908 can include hardware, such as a special purpose processing device to perform a certain function or group of functions. Alternatively, the components 902-908 of the multi-modal gradient attention system 102 can include a combination of computer-executable instructions and hardware.

Furthermore, the components 902-908 of the multi-modal gradient attention system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-908 may be implemented as a stand-alone application, such as a desktop or mobile application. Furthermore, the components 902-908 may be implemented as one or more web-based applications hosted on a remote server. The components 902-908 may also be implemented in a suite of mobile device applications or "apps." To illustrate, the components 902-908 may be implemented in an application, including but not limited to Adobe Creative Cloud, Adobe Document Cloud, Adobe Express, Adobe Illustrator, Adobe Photoshop, and Adobe Premiere. The foregoing are either registered trademarks or trademarks of Adobe in the United States and/or other countries.

Figure 10:
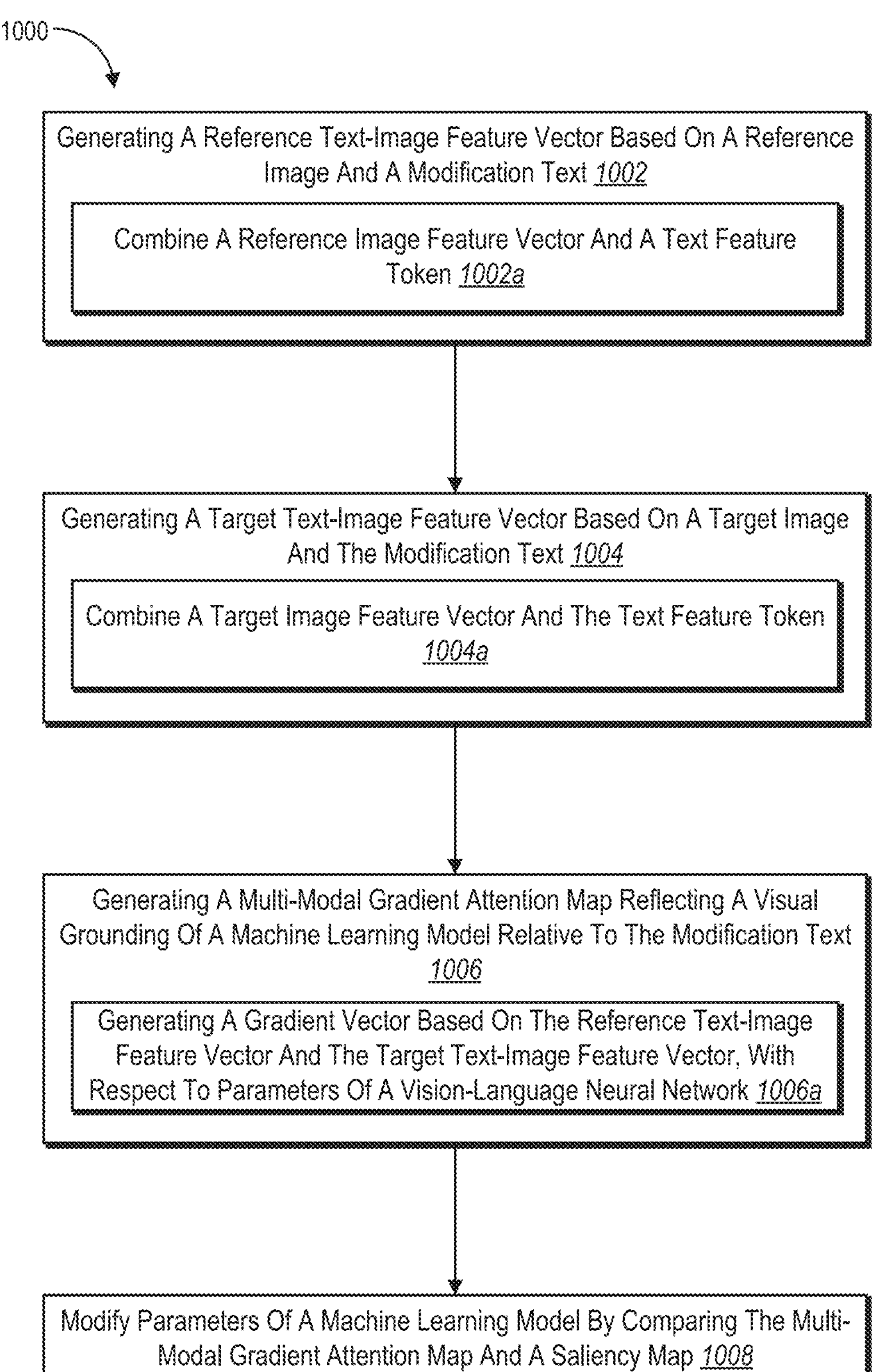
FIG. 10 illustrates a flowchart of a series of acts for generating a multi-modal gradient attention map and modifying parameters of a machine learning model utilizing the multi-modal gradient attention map, in accordance with one or more embodiments.

FIGS. 1-9, the corresponding text, and the examples provide a number of different methods, systems, devices, and non-transitory computer-readable media of the multi-modal gradient attention system 102. In addition to the foregoing, one or more embodiments can also be described in terms of flowcharts comprising acts for accomplishing a particular result, as shown in FIG. 10. FIG. 10 may be performed with more or fewer acts. Further, the acts may be performed in differing orders. Additionally, the acts described herein may be repeated or performed in parallel with one another or parallel with different instances of the same or similar acts.

As mentioned, FIG. 10 illustrates a flowchart of a series of acts 1000 for generating a multi-modal gradient attention map and modifying parameters of a machine learning model utilizing the multi-modal gradient attention map in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As shown in FIG. 10, the series of acts 1000 includes an act 1002 of generating a reference text-image feature vector based on a reference image and a modification text, an act 1004 of generating a target text-image feature vector based on a target image and the modification text, an act 1006 of generating a multi-modal gradient attention map reflecting a visual grounding of a machine learning model relative to the modification text, and an act 1008 of modifying parameters of the machine learning model by comparing the multi-modal gradient attention map and a saliency map. Furthermore, as shown in FIG. 10, the series of acts 1000 includes an act 1002*a* of combining a reference image feature vector and a text feature token, an act 1004*a* of combining a target image feature vector and the text feature token, and an act 1006*a* of generating a gradient vector based on the reference text-image feature vector and the target text-image feature vector, with respect to parameters of a vision-language neural network.

In particular, the act 1002 can include generating, utilizing a vision-language neural network of an image-text comparison machine learning model, a reference text-image feature vector based on a reference image and a modification text, the act 1004 can include generating, utilizing the vision-language neural network of the image-text comparison machine learning model, a target text-image feature vector based on a target image and the modification text, and the act 1006 can include generating, from the reference text-image feature vector and the target text-image feature vector, a multi-modal gradient attention map reflecting a visual grounding of the image-text comparison machine learning model relative to the modification text.

Moreover, the act 1002 can include generating, utilizing a machine learning model, a reference text-image feature vector from a reference image and a modification text, the act 1004 can include generating, utilizing the machine learning model, a target text-image feature vector from a target image and the modification text, the act 1006 can include generating a multi-modal gradient attention map utilizing the reference text-image feature vector and the target text-image feature vector, and the act 1008 can include modifying parameters of the machine learning model by comparing the multi-modal gradient attention map and a saliency map.

Furthermore, the act 1002 can include generating, utilizing a vision-language neural network of a machine learning model, a reference text-image feature vector based on a reference image and a modification text, the act 1004 can include generating, utilizing the vision-language neural network of the machine learning model, a target text-image feature vector based on a target image and the modification text, the series of acts 1000 can include determining, utilizing the machine learning model, a predicted measure of similarity between the reference image conditioned on the modification text and the target image, and the act 1006 can include generating, from the reference text-image feature vector and the target text-image feature vector, a multi-modal gradient attention map reflecting a visual grounding of the machine learning model in determining the predicted measure of similarity.

For example, in some implementations, the series of acts 1000 includes providing the multi-modal gradient attention map for display via a graphical user interface of a client device. Moreover, in some implementations, the series of acts 1000 includes selecting, based on the predicted measure of similarity, the target image for display via a graphical user interface. Furthermore, in some implementations, the series of acts 1000 includes providing the multi-modal gradient attention map for display with the reference image via a graphical user interface. In some implementations, the series of acts 1000 includes providing the multi-modal gradient attention map for display with the target image via a graphical user interface.

In addition, in some implementations, the series of acts 1000 includes generating, utilizing an image encoder of the image-text comparison machine learning model, a reference image feature vector from the reference image. In some implementations, the series of acts 1000 includes generating, utilizing the image encoder of the image-text comparison machine learning model, a target image feature vector from the target image. In some implementations, the series of acts 1000 includes generating, utilizing a text encoder of the image-text comparison machine learning model, a text feature token from the modification text. Additionally, in some implementations, the series of acts 1000 includes generating the reference text-image feature vector by utilizing the vision-language neural network to combine the reference image feature vector and the text feature token. In some implementations, the series of acts 1000 includes generating the target text-image feature vector by utilizing the vision-language neural network to combine the target image feature vector and the text feature token.

Moreover, in some implementations, the series of acts 1000 includes generating the multi-modal gradient attention map by determining a scalar signal from the reference text-image feature vector and the target text-image feature vector. In some implementations, the series of acts 1000 includes generating the multi-modal gradient attention map by determining a product of the reference text-image feature vector and the target text-image feature vector. Additionally, in some implementations, the series of acts 1000 includes generating the multi-modal gradient attention map by generating a gradient vector based on the scalar signal with respect to parameters of the vision-language neural network. In some implementations, the series or acts 1000 includes generating the multi-modal gradient attention map by generating a gradient vector based on the reference text-image feature vector and the target text-image feature vector, with respect to fully connected parameters of the machine learning model. Furthermore, in some implementations, the series of acts 1000 includes generating the multi-modal gradient attention map by combining the gradient vector with the target text-image feature vector.

In addition, in some implementations, the series of acts 1000 includes generating the saliency map based on the modification text. Furthermore, in some implementations, the series of acts 1000 includes comparing the multi-modal gradient attention map and the saliency map by determining a product of the multi-modal gradient attention map and the saliency map.

In some implementations, the series of acts 1000 includes determining a multi-modal gradient attention loss by comparing the multi-modal gradient attention map and a saliency map. In some implementations, the series of acts 1000 includes modifying parameters of the machine learning model based on the multi-modal gradient attention loss. Moreover, in some implementations, the series of acts 1000 includes modifying parameters of the image-text comparison machine learning model by comparing the multi-modal gradient attention map and a saliency map of the reference image based on the modification text. Furthermore, in some implementations, the series of acts 1000 includes modifying the parameters of the machine learning model by combining a multi-modal gradient attention loss and a quadruplet loss. Additionally, in some implementations, the series of acts 1000 includes generating the reference text-image feature vector and the target text-image feature vector utilizing a vision-language Siamese transformer.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions from a non-transitory computer-readable medium (e.g., memory) and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general purpose computer, special purpose computer, or special purpose processing device to perform a certain function or group of functions. In some embodiments, computer-executable instructions are executed by a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), a web service, Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
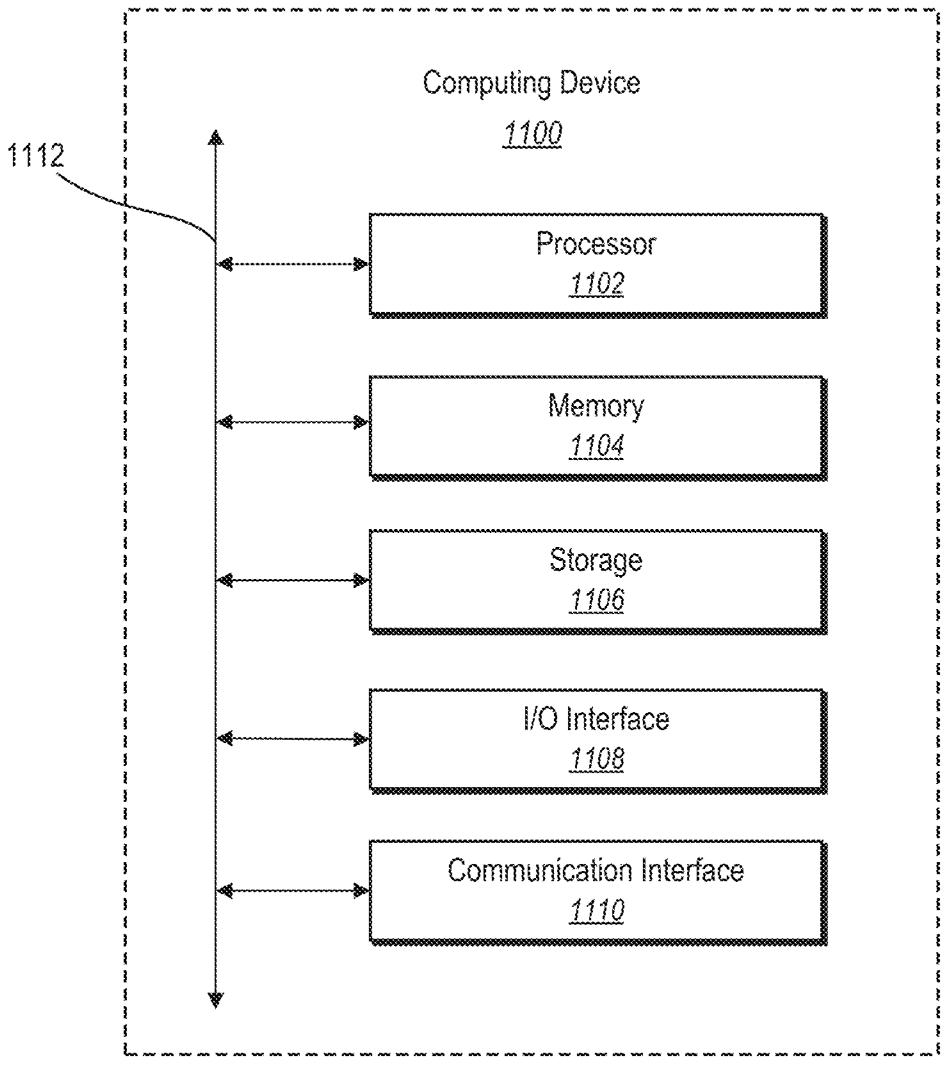
FIG. 11 illustrates a block diagram of an example computing device for implementing one or more embodiments of the present disclosure.

FIG. 11 illustrates a block diagram of an example computing device 1100 that may be configured to perform one or more of the processes described above. One will appreciate that one or more computing devices, such as the computing device 1100 may represent the computing devices described above (e.g., the computing device(s) 900, the server device(s) 106, or the client device 108). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes the memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes the storage device 1106 for storing data or instructions. As an example, and not by way of limitation, the storage device 1106 can include a non-transitory storage medium described above. The storage device 1106 may include a hard disk drive ("HDD"), flash memory, a Universal Serial Bus ("USB") drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller ("NIC") or network adapter for communicating with an Ethernet or other wire-based network or a wireless NIC ("WNIC") or wireless adapter for communicating with a wireless network, such as a WI-FI. The computing device 1100 can further include the bus 1112. The bus 1112 can include hardware, software, or both that connects components of computing device 1100 to each other.

The use in the foregoing description and in the appended claims of the terms "first," "second," "third," etc., is not necessarily to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget, and not necessarily to connote that the second widget has two sides.

In the foregoing description, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

generating, utilizing a vision-language neural network of an image-text comparison machine learning model, a reference text-image feature vector based on a reference image and a modification text;

generating, utilizing the vision-language neural network of the image-text comparison machine learning model, a target text-image feature vector based on a target image and the modification text; and generating, from the reference text-image feature vector and the target text-image feature vector comprising the modification text, a multi-modal gradient attention map by utilizing a gradient of a similarity metric between the reference text-image feature vector and the target text-image feature vector with respect to parameters of the vision-language neural network, the multi-modal gradient attention map reflecting a visual grounding of the image-text comparison machine learning model relative to the modification text.

2. The computer-implemented method of claim 1, further comprising providing the multi-modal gradient attention map for display via a graphical user interface of a client device.

3. The computer-implemented method of claim 1, further comprising:

generating, utilizing an image encoder of the image-text comparison machine learning model, a reference image feature vector from the reference image;

generating, utilizing the image encoder of the image-text comparison machine learning model, a target image feature vector from the target image; and generating, utilizing a text encoder of the image-text comparison machine learning model, a text feature token from the modification text.

4. The computer-implemented method of claim 3, wherein:

generating the reference text-image feature vector comprises utilizing the vision-language neural network to combine the reference image feature vector and the text feature token; and generating the target text-image feature vector comprises utilizing the vision-language neural network to combine the target image feature vector and the text feature token.

5. The computer-implemented method of claim 1, wherein generating the multi-modal gradient attention map comprises determining the similarity metric from the reference text-image feature vector and the target text-image feature vector according to a cosine similarity between the reference text-image feature vector and the target text-image feature vector.

6. The computer-implemented method of claim 5, wherein generating the multi-modal gradient attention map further comprises generating a gradient vector based on the similarity metric with respect to a last dense layer of the vision-language neural network.

7. The computer-implemented method of claim 1, further comprising modifying the parameters of the image-text comparison machine learning model by comparing the multi-modal gradient attention map and a saliency map of the reference image based on the modification text.

8. A system comprising:

one or more memory devices comprising a reference image, a target image, a modification text, and a machine learning model; and one or more processors configured to cause the system to:

generate, utilizing the machine learning model, a reference text-image feature vector from the reference image and the modification text;

generate, utilizing the machine learning model, a target text-image feature vector from the target image and the modification text;

generate a multi-modal gradient attention map utilizing the reference text-image feature vector and the target text-image feature vector comprising the modification text by utilizing a gradient of a similarity metric between the reference text-image feature vector and the target text-image feature vector with respect to parameters of the machine learning model; and modify the parameters of the machine learning model by comparing the multi-modal gradient attention map and a saliency map.

9. The system of claim 8, wherein the one or more processors are further configured to cause the system to generate the saliency map based on the modification text.

10. The system of claim 8, wherein generating the multi-modal gradient attention map comprises generating a gradient vector based on the reference text-image feature vector and the target text-image feature vector, with respect to fully connected parameters of the machine learning model.

11. The system of claim 10, wherein generating the multi-modal gradient attention map further comprises combining the gradient vector with the target text-image feature vector.

12. The system of claim 8, wherein comparing the multi-modal gradient attention map and the saliency map comprises determining a product of the multi-modal gradient attention map and the saliency map.

13. The system of claim 8, wherein modifying the parameters of the machine learning model comprises combining a multi-modal gradient attention loss and a quadruplet loss.

14. The system of claim 8, further comprising generating the reference text-image feature vector and the target text-image feature vector utilizing a vision-language Siamese transformer.

15. A non-transitory computer-readable medium storing executable instructions that, when executed by a processing device, cause the processing device to perform operations comprising:

generating, utilizing a vision-language neural network of a machine learning model, a reference text-image feature vector based on a reference image and a modification text;

generating, utilizing the vision-language neural network of the machine learning model, a target text-image feature vector based on a target image and the modification text;

determining, utilizing the machine learning model, a predicted measure of similarity between the reference image conditioned on the modification text and the target image; and generating, from the reference text-image feature vector and the target text-image feature vector comprising the modification text, a multi-modal gradient attention map by utilizing a gradient of the predicted measure of similarity between the reference text-image feature vector and the target text-image feature vector with respect to parameters of the vision-language neural network, the multi-modal gradient attention map reflecting a visual grounding of the machine learning model in determining the predicted measure of similarity.

16. The non-transitory computer-readable medium of claim 15, wherein the operations further comprise selecting, based on the predicted measure of similarity, the target image for display via a graphical user interface.

17. The non-transitory computer-readable medium of claim 15, wherein the operations further comprise providing the multi-modal gradient attention map for display with the reference image via a graphical user interface.

18. The non-transitory computer-readable medium of claim 15, wherein the operations further comprise providing the multi-modal gradient attention map for display with the target image via a graphical user interface.

19. The non-transitory computer-readable medium of claim 15, wherein generating the multi-modal gradient attention map comprises determining a product of the reference text-image feature vector and the target text-image feature vector.

20. The non-transitory computer-readable medium of claim 15, wherein the operations further comprise:

determining a multi-modal gradient attention loss by comparing the multi-modal gradient attention map and a saliency map; and modifying the parameters of the machine learning model based on the multi-modal gradient attention loss.

* * * * *